(12) United States Patent
Takahashi et al.

(10) Patent No.: US 8,771,510 B2
(45) Date of Patent: Jul. 8, 2014

(54) SEAWATER DESALINATION SYSTEM AND ENERGY EXCHANGE CHAMBER

(75) Inventors: Tamami Takahashi, Tokyo (JP); Masao Shinoda, Tokyo (JP); Masato Eguchi, Tokyo (JP); Masanori Goto, Tokyo (JP)

(73) Assignee: Ebara Corporation, Tokyo (JP)

( * ) Notice: Subject to any disclaimer, the term of this patent is extended or adjusted under 35 U.S.C. 154(b) by 306 days.

(21) Appl. No.: 13/320,351

(22) PCT Filed: May 17, 2010

(86) PCT No.: PCT/JP2010/058270
§ 371 (c)(1),
(2), (4) Date: Nov. 14, 2011

(87) PCT Pub. No.: WO2010/131765
PCT Pub. Date: Nov. 18, 2010

(65) Prior Publication Data
US 2012/0061309 A1     Mar. 15, 2012

(30) Foreign Application Priority Data

May 15, 2009   (JP) .................................. 2009-118771

(51) Int. Cl.
*B01D 61/06*  (2006.01)
*B01D 61/02*  (2006.01)
*C02F 1/44*   (2006.01)
*B01D 61/08*  (2006.01)
*B01D 61/10*  (2006.01)

(52) U.S. Cl.
CPC .............. *B01D 61/025* (2013.01); *B01D 61/06* (2013.01); *B01D 61/08* (2013.01); *B01D 61/10* (2013.01); *C02F 1/441* (2013.01); *C02F 2303/10* (2013.01); *C02F 2201/004* (2013.01); *B01D 2313/246* (2013.01)
USPC ....................... 210/321.66; 210/251; 210/258

(58) Field of Classification Search
CPC .. C02F 2103/08; C02F 1/441; C02F 2303/10; C02F 2201/004; B01D 61/025; B01D 61/06; B01D 61/08; B01D 61/10; B01D 63/02; B01D 2313/246
USPC .............................. 210/181, 251, 258, 321.66
See application file for complete search history.

(56) References Cited

U.S. PATENT DOCUMENTS

| | | | |
|---|---|---|---|
| 5,306,428 A | 4/1994 | Tonner | |
| 6,187,200 B1 | 2/2001 | Yamamura et al. | |
| 7,168,927 B2 | 1/2007 | Brueckmann et al. | |
| 2006/0151033 A1 | 7/2006 | Rojanskiy et al. | |

FOREIGN PATENT DOCUMENTS

| | | |
|---|---|---|
| CN | 1733615 | 2/2006 |
| CN | 1994905 | 7/2007 |
| JP | 53-124178 | 10/1978 |

(Continued)

OTHER PUBLICATIONS

International Search Report issued Jun. 22, 2010 in International (PCT) Application No. PCT/JP2010/058270.

*Primary Examiner* — John Kim
(74) *Attorney, Agent, or Firm* — Wenderoth, Lind & Ponack, L.L.P.

(57) ABSTRACT

A seawater desalination system which can solve a problem of wear of a sliding member and can suppress mixing of concentrated seawater and seawater by making an energy exchange chamber no-piston configuration is provided. In a seawater desalination system for producing fresh water from seawater by passing the seawater pressurized by a pump through a reverse-osmosis membrane-separation apparatus (4) to separate the seawater into fresh water and concentrated seawater, an energy exchange chamber (20) for utilizing pressure energy of the concentrated seawater discharged from the reverse-osmosis membrane-separation apparatus (3) as energy for pressurizing part of the seawater is provided. The energy exchange chamber includes a concentrated seawater port (P1) for introducing and discharging the concentrated seawater, a seawater port (P2) for introducing and discharging the seawater, and a plurality of partitioned fluid passages (R) provided in the chamber to allow the concentrated seawater port (P1) and the seawater port (P2) to communicate with each other.

21 Claims, 19 Drawing Sheets

(56) References Cited

FOREIGN PATENT DOCUMENTS

| | | |
|---|---|---|
| JP | 6-210140 | 8/1994 |
| JP | 7-12405 | 1/1995 |
| JP | 8-108048 | 4/1996 |
| JP | 10-128325 | 5/1998 |
| JP | 2000-51663 | 2/2000 |
| JP | 2001-46842 | 2/2001 |
| JP | 2001-104954 | 4/2001 |
| JP | 2004-81913 | 3/2004 |
| JP | 2008-20027 | 1/2008 |

Prior Art

Prior Art

SEAWATER DESALINATION SYSTEM AND ENERGY EXCHANGE CHAMBER

TECHNICAL FIELD

The present invention relates to an energy exchange chamber (pressure exchange chamber) which is preferably used in a seawater desalination system (seawater desalination plant) for desalinating seawater by removing salinity from the seawater.

BACKGROUND ART

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the reverse-osmosis pressure and is desalinated, and fresh water (permeate or desalted water) is taken out from the reverse-osmosis membrane-separation apparatus. The remaining seawater is discharged in a concentrated state of a high salt content as a reject (concentrated seawater) from the reverse-osmosis membrane-separation apparatus. The largest operational cost (electric expenses) in the seawater desalination system is energy cost for pressurizing the pretreated seawater up to such a pressure as to overcome the osmotic pressure, i.e. up to the reverse-osmosis pressure. That is, the operational cost of the seawater desalination system depends heavily on pressurizing energy of the seawater by the high-pressure pump.

Specifically, more than half of the electric expenses as the highest cost in the seawater desalination plant are consumed to operate the high-pressure pump for pressurizing the seawater. Therefore, pressure energy possessed by the high-pressure reject (concentrated seawater) with the high salt content which has been discharged from the reverse-osmosis membrane-separation apparatus is utilized for pressurizing part of the seawater. Therefore, as a means for utilizing the pressure energy of the concentrated seawater (brine) discharged from the reverse-osmosis membrane-separation apparatus to pressurize part of the seawater, there has been utilized an energy exchange chamber in which an interior of a cylinder is separated into two volume chambers by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 25 is a schematic view showing a configuration example of a conventional seawater desalination system. As shown in FIG. 25, seawater pumped into the seawater desalination system by an intake pump (not shown) is processed to have certain water qualities by a pretreatment system, and then the pretreated seawater is delivered via a seawater supply line 1 into a high-pressure pump 2 that is directly coupled to a motor M. The seawater which has been pressurized by the high-pressure pump 2 is supplied via a discharge line 3 to a reverse-osmosis membrane-separation apparatus 4. The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a directional control valve 6 to a concentrated seawater port P1 of an energy exchange chamber 10. A seawater supply line 1 for supplying the pretreated seawater having a low pressure is branched at an upstream side of the high-pressure pump 2 and is connected via a valve 7 to a seawater port P2 of the energy exchange chamber 10. The energy exchange chamber 10 has a piston 12 therein, and the piston 12 is arranged to be movable in the energy exchange chamber 10 while separating an interior of the energy exchange chamber 10 into two volume chambers.

The seawater pressurized by utilizing a pressure of the concentrated seawater in the energy exchange chamber 10 is supplied to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4.

This kind of seawater desalination system and energy exchange chamber is described in, for example, U.S. Pat. No. 5,306,428, U.S. Patent Laid-Open Publication No. 2006-0151033, U.S. Pat. No. 7,168,927, and the like.

In the energy exchange chamber 10, the directional control valve 6 is switched to a discharge side for discharging the concentrated seawater to suck the seawater of the seawater port P2, and the seawater flows from the seawater port P2 into the energy exchange chamber to move the piston 12 to a side of the concentrated seawater port P1. In this state, the energy exchange chamber 10 is nearly filled with the seawater. Then, the directional control valve 6 is switched to a supply side for supplying the high-pressure concentrated seawater to the energy exchange chamber 10, and the piston 12 moves toward a side of the seawater port P2 so as to push the seawater which has flowed into the energy exchange chamber 10, thereby supplying the seawater to the booster pump 8 through the valve 7 at a side of the seawater port P2.

The valve 7 at the side of the seawater port P2 is composed of a well-known fluid machine such as a check valve or a directional control valve so that the high-pressure fluid flows to the booster pump 8 and the low-pressure fluid flows to the energy exchange chamber 10.

Since the booster pump 8 pressurizes the seawater which has been already pressurized by the energy exchange chamber 10, to the same pressure level as the high-pressure pump 2, the booster pump 8 can be driven by a small amount of energy. Specifically, the flow rate of the seawater supplied to the reverse-osmosis membrane-separation apparatus 4 becomes the flow rate obtained by adding the flow rate of the seawater from the energy exchange chamber 10 to the flow rate of the seawater from the high-pressure pump 2, and thus the flow rate of the seawater to be treated in the entire system becomes large. Because the seawater supplied from the energy exchange chamber 10 has been pressurized by utilizing energy of the high-pressure concentrated seawater, input energy in the entire system can be reduced. In other words, the system which can reduce capacity and driving energy of the high-pressure pump to obtain the same flow rate of the seawater to be treated can be constructed.

The above-described conventional energy exchange chamber is suitably selected in its size and in number depending on the capacity (flow rate) to be treated in the seawater desalination system, and the conventional energy exchange chamber is generally in the form of an elongated cylinder having a large diameter and has a piston arranged to be movable in the cylinder so that an interior of the cylinder is separated into two volume chambers.

FIG. 26 is a cross-sectional view showing a configuration example of a conventional energy exchange chamber 10. As shown in FIG. 26, the energy exchange chamber 10 comprises a cylinder 11 having a cylindrical shape, a piston 12 which is reciprocated in the cylinder 11, and flanges 13 for closing both opening ends of the cylinder 11. The flanges 13 are fixed to flange portions 11f of the cylinder 11 by bolts 14 and nuts 15, and a concentrated seawater port P1 is formed in one of the flanges 13 and a seawater port P2 is formed in the other of the flanges 13.

In this case, for the purpose of improving sliding characteristics of the piston 12 against the inner wall of the cylinder, sliding rings 16 are mounted on a cylindrical surface of the cylindrical piston 12. The sliding ring 16 is composed of a material having a low friction and excellent wear resistance, and, for example, engineering plastics or the like is selected. The piston 12 is always reciprocated in the chamber because the seawater flows into the chamber and is then pushed out by the concentrated seawater. Therefore, even if the piston 12 is composed of a material having excellent wear resistance, the piston 12 is eventually worn and required to be replaced. Further, the piston 12 is reciprocated in the chamber, and hence it is difficult to grasp wear status. When the sliding seal 16 is worn, a metal part of the piston 12 is brought into direct contact with a metal part of the cylinder 11 to cause damage to each of the metal parts. According to circumstances, the chamber itself must be replaced.

Further, an inner diameter of the energy exchange chamber is required to be an uniform cylinder so as to fit with an outer diameter of the piston (outer diameter of the sliding seal). Therefore, when the chamber becomes long as much as several meters, it is difficult to process the inner diameter of the chamber, and eventually the chamber itself becomes a very expensive product.

CITATION LIST

Patent Literature

PTL 1: U.S. Pat. No. 5,306,428
PTL 2: U.S. Patent Laid-Open Publication No. 2006-0151033
PTL 3: U.S. Pat. No. 7,168,927

SUMMARY OF INVENTION

Technical Problem

As described above, the conventional energy exchange chamber is required to reciprocate the piston in the chamber, thereby sucking the seawater and discharging the seawater. Thus, the position of the piston in the chamber is reciprocated between the concentrated seawater port side and the seawater port side.

Therefore, the piston in the conventional energy exchange chamber is brought into sliding contact with the inner wall of the cylinder, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

The present inventors have studied to apply an energy exchange chamber having no piston to a seawater desalination system. In this energy exchange chamber, an interface between concentrated seawater and seawater moves by a pressure balance between the concentrated seawater and the seawater.

In this method, there is a problem that salt concentration of the intake seawater becomes high in the chamber due to mixing of the concentrated seawater and the seawater in the interface. Thus, when the seawater pressurized in the chamber and the seawater discharged from the high-pressure pump merge and are introduced into the reverse-osmosis membrane-separation apparatus, the salt concentration of the pressurized seawater becomes high. Therefore, desalination rate of the reverse-osmosis membrane is lowered and/or a life of the reverse-osmosis membrane is shortened, and thus it is estimated that the replacement cycle of the reverse-osmosis membrane itself is shortened.

The present invention has been made in view of the above circumstances. It is therefore an object of the present invention to provide an energy exchange chamber which can solve a problem of wear of a sliding member and does not require excessive machining accuracy of the chamber and excessively elongated machining of the chamber by making the energy exchange chamber, for pressurizing part of the seawater by pressure energy of the concentrated seawater discharged from a reverse-osmosis membrane-separation apparatus in a seawater desalination system, no-piston configuration, and can suppress mixing of concentrated seawater and seawater in the chamber irrespective of the no-piston configuration and to provide a seawater desalination system having such energy exchange chamber.

Solution to Problem

In order to achieve the above object, according to the present invention, there is provided a seawater desalination system for producing fresh water from seawater by passing the seawater pressurized by a pump through a reverse-osmosis membrane-separation apparatus to separate the seawater into fresh water and concentrated seawater, the seawater desalination system comprising: an energy exchange chamber configured to utilize pressure energy of the concentrated seawater discharged from the reverse-osmosis membrane-separation apparatus as energy for pressurizing part of the seawater; the energy exchange chamber comprising: a concentrated seawater port for introducing and discharging the concentrated seawater; a seawater port for introducing and discharging the seawater; and a plurality of partitioned fluid passages provided in the chamber to allow the concentrated seawater port and the seawater port to communicate with each other.

According to the present invention, the concentrated seawater which has flowed into the chamber from the concentrated seawater port and the seawater which has flowed into the chamber from the seawater port flow into a plurality of partitioned fluid passages, and in these fluid passages, the concentrated seawater and the seawater are brought into contact with each other. Because vortexes generated in the fluid passage having a small cross-sectional area become small vortexes in the conduit, the concentrated seawater and the seawater do not diffuse widely and the interface between the concentrated seawater and the seawater is not disturbed. In this manner, because a plurality of fluid passages having a small cross-sectional area are assembled to form a large chamber, the interface between the concentrated seawater and the seawater is maintained in each of the fluid passages, and the interface between the concentrated seawater and the seawater is maintained in the entire chamber. Specifically, while mixing of the concentrated seawater and the seawater is suppressed, the seawater can be pressurized and discharged by the concentrated seawater. In a boundary where the concentrated seawater and the seawater are in contact with each other, the concentrated seawater and the seawater are mixed. Therefore, here, the interface is defined as a boundary portion between the concentrated seawater and the seawater, and an area (described later) where the concentrated seawater and the seawater are mixed at a predetermined rate. This area is an area which has a predetermined volume.

According to the present invention, the piston is not required in the chamber, and thus maintenance is unnecessary to improve reliability as a system. Further, because cylindrical machining in the chamber becomes easy, manufacturing of the chamber becomes easy and inexpensive.

In a preferred aspect of the present invention, the plurality of partitioned fluid passages comprise a plurality of tubes.

According to the present invention, because the plurality of partitioned fluid passages comprise a plurality of tubes, the plurality of fluid passages can be easily provided in the chamber.

In a preferred aspect of the present invention, the plurality of partitioned fluid passages are formed by a plurality of partitions.

According to the present invention, because the plurality of partitioned fluid passages are formed by a plurality of partitions, the plurality of fluid passages can be easily provided in the chamber.

In a preferred aspect of the present invention, the plurality of partitioned fluid passages are formed by honeycomb.

According to the present invention, because the plurality of partitioned fluid passages are formed by honeycomb, the plurality of fluid passages can be easily provided in the chamber.

In a preferred aspect of the present invention, the seawater desalination system further comprises a pipe for supporting (holding) the plurality of partitioned fluid passages; wherein the pipe is fitted in the energy exchange chamber.

According to the present invention, because the pipe for supporting the plurality of partitioned fluid passages has approximately the same outer diameter as the inner diameter of the chamber and is removably provided in the chamber, the fluid passages comprising the tubes, honeycomb or the like themselves can be easily replaced. Further, when the fluid passages comprising the tubes, honeycomb or the like are installed in the chamber as a pressure-resistant container, only the pipe in which the fluid passages are installed is fitted as a separate piece into the chamber without applying machining, welding, adhesion, and the like to the chamber. Thus, the structure becomes simple and assembly becomes easy.

In a preferred aspect of the present invention, the pipe is divided into plural pieces in a longitudinal direction of the pipe.

According to the present invention, the pipe for supporting the plurality of partitioned fluid passages is divided into plural pieces, and thus the configuration in which the fluid passages in the pipe are divided into plural pieces in a longitudinal direction of the pipe can be employed, and the tube, the honeycomb or the like constituting a flow passage can be easily manufactured.

In a preferred aspect of the present invention, the pipe is extended to a space in the energy exchange chamber in which the plurality of partitioned fluid passages are not provided.

According to the present invention, because the pipe is extended to a space in which the plurality of partitioned fluid passages are not provided, a flow regulator or the like can be installed in the extended pipe.

In a preferred aspect of the present invention, the pipe has a hole for allowing an inner diameter side and an outer diameter side of the pipe to communicate with each other.

According to the present invention, because the hole for allowing an inner diameter side and an outer diameter side of the pipe to communicate with each other functions as a pressure balance hole, even if a high internal pressure is applied to the pipe, by releasing this internal pressure from the pressure balance hole, the internal pressure and the external pressure of the pipe can be equivalent to cancel out the force applied to the pipe.

In a preferred aspect of the present invention, a plurality of the energy exchange chambers are provided; and there is provided at least one switching valve for switching supply of the concentrated seawater to the concentrated seawater port and discharge of the concentrated seawater from the concentrated seawater port in the plurality of energy exchange chambers.

According to the present invention, by providing at least two energy exchange chambers, the following operation is performed.

1) The high-pressure concentrated seawater is introduced via the directional control valve into a first energy exchange chamber, the seawater in the first energy exchange chamber is pressurized using pressure of the concentrated seawater, and the pressurized seawater is discharged from the first energy exchange chamber. At the same time, the seawater is introduced into a second energy exchange chamber, and, simultaneously, the concentrated seawater in the second energy exchange chamber is discharged through the directional control valve.

2) The high-pressure concentrated seawater is introduced via the directional control valve into the second energy exchange chamber, the seawater in the second energy exchange chamber is pressurized using pressure of the concentrated seawater, and the pressurized seawater is discharged from the second energy exchange chamber. At the same time, the seawater is introduced into the first energy exchange chamber, and, simultaneously, the concentrated seawater in the first energy exchange chamber is discharged through the directional control valve.

Therefore, according to the present invention, the pressurized seawater can be constantly discharged and discharge flow rate from the energy exchange chamber can be stabilized, and eventually supply of fresh water from the reverse-osmosis membrane-separation apparatus can be stably performed.

In a preferred aspect of the present invention, the seawater desalination system further comprises another energy exchange chamber comprising a concentrated seawater port for introducing and discharging the concentrated seawater, a seawater port for introducing and discharging the seawater, and a piston capable of reciprocating in the chamber.

According to the present invention, in the energy exchange chamber having a plurality of partitioned fluid passages for allowing the concentrated seawater port and the seawater port to communicate with each other, the interface between the concentrated seawater and the seawater is maintained in each of the fluid passages and the interface between the concentrated seawater and the seawater is maintained in the entire chamber. Specifically, while mixing of the concentrated seawater and the seawater is suppressed, the seawater is pressurized and discharged by the concentrated seawater. At the same time, in another energy exchange chamber having a piston capable of reciprocating in the chamber, by moving the piston with the concentrated seawater, the seawater can be pressurized and discharged.

In a preferred aspect of the present invention, another energy exchange chamber has a sensor for detecting a position of the piston.

According to the present invention, the sensors detect the present or absence of the piston, and the fluid passages of the directional control valve can be switched to shift the moving direction of the piston on the basis of the signals of the sensors. Also, in the energy exchange chamber having a plurality of fluid passages and having no piston, supply and discharge of the concentrated seawater and the seawater are switched on the basis of the signals of the sensors. In this manner, by detecting the position of the piston in one of the energy exchange chambers, even if the moving velocity of the piston is changed due to variation of pressure and flow rate of the concentrated seawater and the seawater, supply and discharge of water in the other of the energy exchange chambers can be switched in response to such variation. Therefore, in the energy exchange chamber having a plurality of fluid passages and having no piston, supply and discharge of water can be properly performed to adapt to perturbations of the system without supplying the concentrated seawater excessively or sucking the seawater excessively.

According to the present invention, there is provided an energy exchange chamber for utilizing pressure energy of concentrated seawater discharged from a reverse-osmosis membrane-separation apparatus as energy for pressurizing seawater in a seawater desalination system for producing fresh water from the seawater by passing the seawater pressurized by a pump through the reverse-osmosis membrane-separation apparatus to separate the seawater into fresh water and concentrated seawater, the energy exchange chamber comprising: a concentrated seawater port for introducing and discharging the concentrated seawater; a seawater port for introducing and discharging the seawater; and a plurality of partitioned fluid passages provided in the chamber to allow the concentrated seawater port and the seawater port to communicate with each other.

According to the present invention, the concentrated seawater which has flowed into the chamber from the concentrated seawater port and the seawater which has flowed into the chamber from the seawater port flow into a plurality of partitioned fluid passages, and in these fluid passages, the concentrated seawater and the seawater are brought into contact with each other. Because vortexes generated in the fluid passage having a small cross-sectional area become small vortexes in the conduit, the concentrated seawater and the seawater do not diffuse widely and the interface between the concentrated seawater and the seawater is not disturbed. In this manner, because a plurality of fluid passages having a small cross-sectional area are assembled to form a large chamber, the interface between the concentrated seawater and the seawater is maintained in each of the fluid passages, and the interface between the concentrated seawater and the seawater is maintained in the entire chamber. Specifically, while mixing of the concentrated seawater and the seawater is suppressed, the seawater can be pressurized and discharged by the concentrated seawater According to the present invention, the piston is not required in the chamber, and thus maintenance is unnecessary to improve reliability as a system. Further, because cylindrical machining in the chamber becomes easy, manufacturing of the chamber becomes easy and inexpensive.

In a preferred aspect of the present invention, the plurality of partitioned fluid passages comprise a plurality of tubes.

According to the present invention, because the plurality of partitioned fluid passages comprise a plurality of tubes, the chamber can be easily manufactured.

In a preferred aspect of the present invention, the plurality of partitioned fluid passages are formed by a plurality of partitions.

According to the present invention, because the plurality of partitioned fluid passages are formed by a plurality of partitions, the chamber can be easily manufactured.

In a preferred aspect of the present invention, the plurality of partitioned fluid passages are formed by honeycomb.

According to the present invention, because the plurality of partitioned fluid passages are formed by honeycomb, the chamber can be easily manufactured.

In a preferred aspect of the present invention, the energy exchange chamber further comprises a pipe for supporting the plurality of partitioned fluid passages; wherein the pipe is fitted in the energy exchange chamber.

According to the present invention, because the pipe for supporting the plurality of partitioned fluid passages has approximately the same outer diameter as the inner diameter of the chamber and is removably provided in the chamber, the fluid passages comprising the tubes, honeycomb or the like themselves can be easily replaced. Further, when the fluid passages comprising the tubes, honeycomb or the like are installed in the chamber as a pressure-resistant container, only the pipe in which the fluid passages are installed is fitted as a separate piece into the chamber without applying machining, welding, adhesion, and the like to the chamber. Thus, the structure becomes simple and assembly becomes easy.

In a preferred aspect of the present invention, the pipe is divided into plural pieces in a longitudinal direction of the pipe.

According to the present invention, the pipe for supporting the plurality of partitioned fluid passages is divided into plural pieces, and thus the configuration in which the fluid passages in the pipe are divided into plural pieces in a longitudinal direction of the pipe can be employed, and the tube, the honeycomb or the like constituting a flow passage can be easily manufactured.

In a preferred aspect of the present invention, the pipe is extended to a space in the energy exchange chamber in which the plurality of partitioned fluid passages are not provided.

According to the present invention, because the pipe is extended to a space in which the plurality of partitioned fluid passages are not provided, a flow regulator or the like can be installed in the extended pipe.

In a preferred aspect of the present invention, the pipe has a hole for allowing an inner diameter side and an outer diameter side of the pipe to communicate with each other.

According to the present invention, because the hole for allowing an inner diameter side and an outer diameter side of the pipe to communicate with each other functions as a pressure balance hole, even if a high internal pressure is applied to the pipe, by releasing this internal pressure from the pressure balance hole, the internal pressure and the external pressure of the pipe can be equivalent to cancel out the force applied to the pipe.

In a preferred aspect of the present invention, a flow regulator is provided between the concentrated seawater port and the plurality of partitioned fluid passages.

According to the present invention, the concentrated seawater which has flowed in the chamber can be uniformly flowed in the partitioned fluid passages, and thus the interface between the concentrated seawater and the seawater can be equalized.

In a preferred aspect of the present invention, a flow regulator is provided between the seawater port and the plurality of partitioned fluid passages.

According to the present invention, the seawater which has flowed in the chamber can be uniformly flowed in the partitioned fluid passages, and thus the interface between the concentrated seawater and the seawater can be equalized.

According to the present invention, there is provided an energy exchange chamber apparatus for utilizing pressure energy of concentrated seawater discharged from a reverse-osmosis membrane-separation apparatus as energy for pressurizing seawater in a seawater desalination system for producing fresh water from the seawater by passing the seawater pressurized by a pump through the reverse-osmosis membrane-separation apparatus to separate the seawater into fresh water and concentrated seawater, the energy exchange chamber apparatus comprising: a cylindrical rotor rotatably provided in a casing; a plurality of energy exchange chambers provided in the rotor and provided around a rotating axis of the rotor; and port plates fixed to the casing and provided so as to face both ends of the rotor; wherein a concentrated seawater port for supplying and discharging the concentrated seawater is formed in one of the port plates, a seawater port for supplying and discharging the seawater is formed in the other of the port plates, and fluid communication between the respective ports and the energy exchange chambers is switched by rotation of the rotor; and wherein a plurality of partitioned fluid passages for allowing the concentrated seawater port and the seawater port to communicate with each other are provided in the energy exchange chamber.

According to the present invention, when the rotor is rotated about the rotating axis, a plurality of energy exchange chambers formed around the rotating axis are rotated. Therefore, fluid communication between the respective chambers, and the concentrated seawater port and the seawater port formed in the port blocks is switched. Thus, the seawater can be pressurized and discharged by introducing the concentrated seawater into one energy exchange chamber, and, at the same time, the concentrated seawater can be discharged by sucking the seawater into another energy exchange chamber. Further, by forming a plurality of partitioned fluid passages having a small cross-sectional area in the energy exchange chambers formed, the seawater can be pressurized and discharged by the concentrated seawater while suppressing mixing of the concentrated seawater and the seawater.

According to the present invention, because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide sufficient performance and the replacement cycle of the reverse-osmosis membrane itself can be prolonged.

Advantageous Effects of Invention

According to the present invention, the following effects can be achieved.

1) Because of no-piston configuration in the chamber, a problem of wear of a sliding member can be solved and excessive machining accuracy of the chamber and excessively elongated machining of the chamber are not required. Therefore, the manufacturing cost of the chamber can be reduced.

2) Mixing of concentrated seawater and seawater in the chamber can be suppressed irrespective of the no-piston configuration in the chamber, and the seawater can be pressurized by the concentrated seawater while the interface between the concentrated seawater and the seawater is maintained.

3) Because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide sufficient performance and the replacement cycle of the reverse-osmosis membrane itself can be prolonged.

4) The pipe for supporting a plurality of partitioned fluid passages has approximately the same outer diameter as the inner diameter of the chamber and is removably provided in the chamber, and thus the fluid passages comprising the tubes, honeycomb or the like themselves can be easily replaced. Further, when the fluid passages comprising the tubes, honeycomb or the like are installed in the chamber as a pressure-resistant container, only the pipe in which the fluid passages are installed is fitted as a separate piece into the chamber without applying machining, welding, adhesion, and the like to the chamber. Thus, the structure becomes simple and assembly becomes easy.

DESCRIPTION OF EMBODIMENTS

Figure 1:
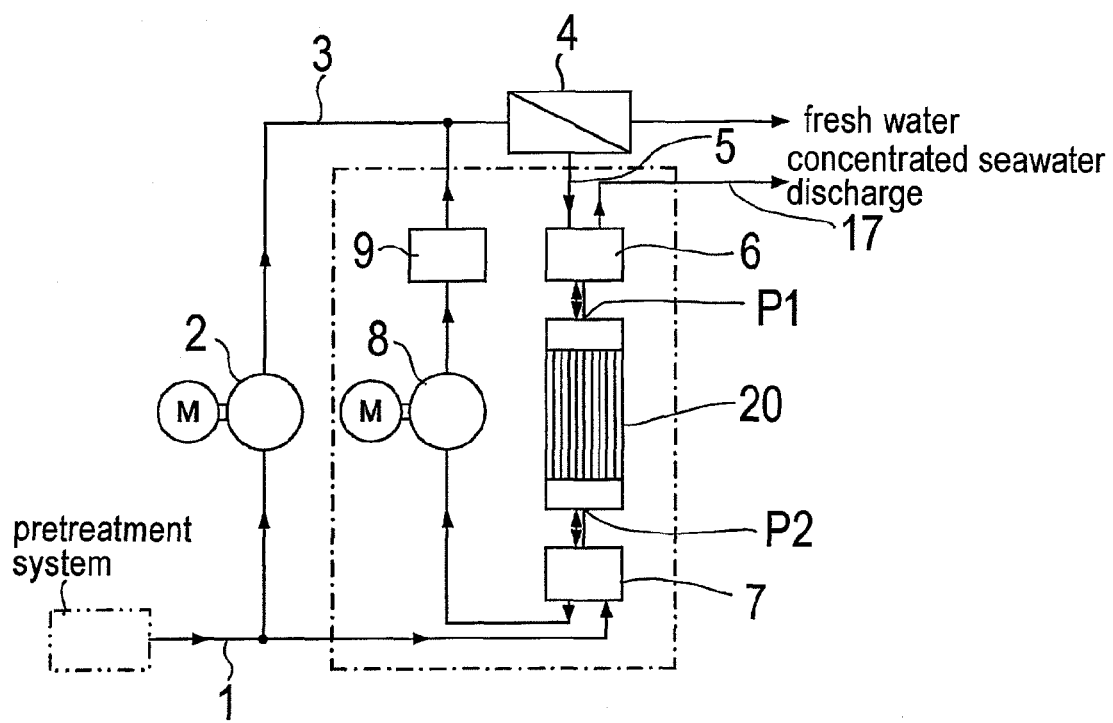
FIG. 1 is a schematic view showing a configuration example of a seawater desalination system according to the present invention.

A seawater desalination system according to preferred embodiments of the present invention will be described in detail below with reference to FIGS. 1 through 24. Like or corresponding parts are denoted by like or corresponding reference numerals in FIGS. 1 through 24 and will not be described below repetitively.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system, and then the pretreated seawater is delivered via a seawater supply line 1 into a high-pressure pump 2 that is directly coupled to a motor M. The seawater which has been pressurized by the high-pressure pump 2 is supplied via a discharge line 3 to a reverse-osmosis membrane-separation apparatus 4. The reverse-osmosis membrane-separation apparatus 4 separates the seawater into concentrated seawater (brine) with a high salt content and fresh water (permeate or desalted water) with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a directional control valve 6 to a concentrated seawater port P1 of an energy exchange chamber (pressure exchange chamber) 20. A seawater supply line 1 for supplying the pretreated seawater having a low pressure is branched at an upstream side of the high-pressure pump 2 and is connected via a valve 7 to a seawater port P2 of the energy exchange chamber 20. The energy exchange chamber 20 has fluid passages partitioned between the concentrated seawater port P1 and the seawater port P2 in the chamber, and energy transmission is carried out while separating two fluids by an interface between the concentrated seawater and the seawater.

The seawater pressurized by utilizing a pressure of the concentrated seawater in the energy exchange chamber 20 is supplied to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4. On the other hand, the concentrated seawater which has pressurized the seawater and lost the energy is discharged from the energy exchange chamber 20 via the directional control valve 6 to a concentrated seawater discharge line 17.

Figure 2:
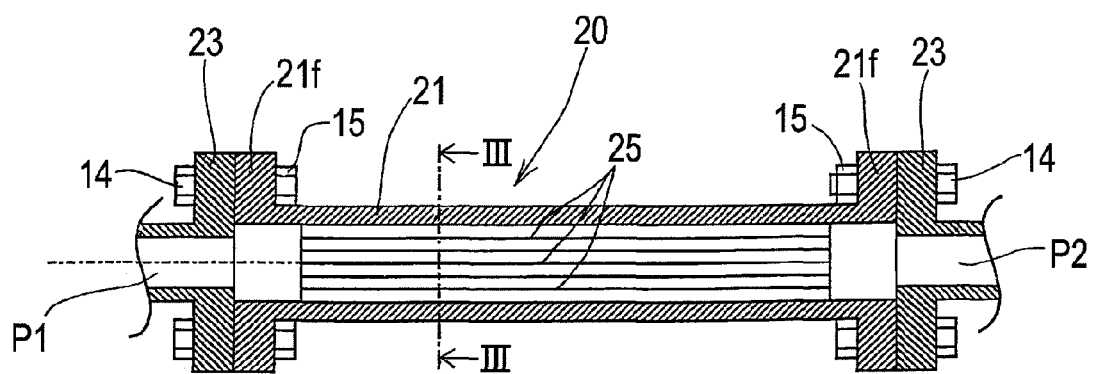
FIG. 2 is a cross-sectional view showing a configuration example of the energy exchange chamber according to the present invention.

FIG. 2 is a cross-sectional view showing a configuration example of the energy exchange chamber 20 according to the present invention. As shown in FIG. 2, the energy exchange chamber 20 comprises a long cylinder 21 having a cylindrical shape, and flanges 23 for closing both opening ends of the cylinder 21. The flanges 23 are fixed to flange portions 21f of the cylinder 11 by bolts 14 and nuts 15, and a concentrated seawater port P1 is formed in one of the flanges 23 and a seawater port P2 is formed in the other of the flanges 23. A plurality of tubes 25 having a diameter smaller than that of a chamber defined in the cylinder 21 are disposed between the concentrated seawater port P1 and the seawater port P2 in the cylinder 21. A plurality of partitioned fluid passages are formed by the plurality of tubes 25 having a small diameter and fixed in the chamber. Thus, the concentrated seawater port P1 and the seawater port P2 communicate with each other by these fluid passages.

Figure 3:
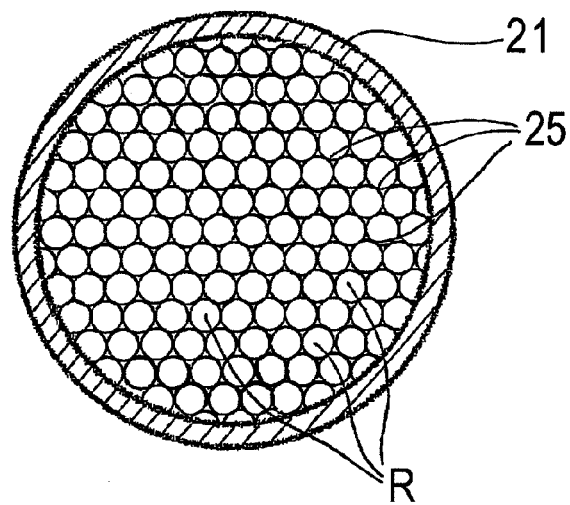
FIG. 3 is a cross-sectional view taken along line of FIG. 2.

FIG. 3 is a cross-sectional view taken along line of FIG. 2. As shown in FIG. 3, a plurality of tubes having a small diameter are disposed in the chamber formed in the cylinder 21. Fluid passages R for allowing concentrated seawater and seawater to flow therein are formed in the respective tubes 25. Because each of the tubes 25 comprises a small diameter tube, a cross-sectional area in the tube is set to be small.

If there is no fluid passage partitioned in the chamber, the concentrated seawater which has flowed in from the concentrated seawater port P1 diffuses in the seawater which has been sucked from the seawater port P2, and thus the concentrated seawater and the seawater are mixed with each other. Also, in the case where the seawater is sucked from the seawater port P2, similarly, the seawater diffuses in the concentrated seawater. This is because when the respective fluids flow into the chamber, vortexes are formed and the fluids diffuse widely.

According to the energy exchange chamber 20 of the present invention, the fluid sucked into the chamber flows into the partitioned fluid passages R having a small cross-sectional area configured by a plurality of tubes 25 fixed in the chamber. At this time, the concentrated seawater and the seawater are brought into contact with each other, and vortexes generated in the fluid passage R having a small cross-sectional area become small vortexes in the conduit. Therefore, the concentrated seawater and the seawater do not diffuse widely and the interface between the concentrated seawater and the seawater is not disturbed. In this manner, because a plurality of fluid passages R having a small cross-sectional area are assembled to form a large chamber, the interface between the concentrated seawater and the seawater is maintained in each of the fluid passages R, and the interface between the concentrated seawater and the seawater is maintained in the entire chamber. Specifically, while mixing of the concentrated seawater and the seawater is suppressed, the seawater is pressurized and discharged by the concentrated seawater.

Figure 4A:
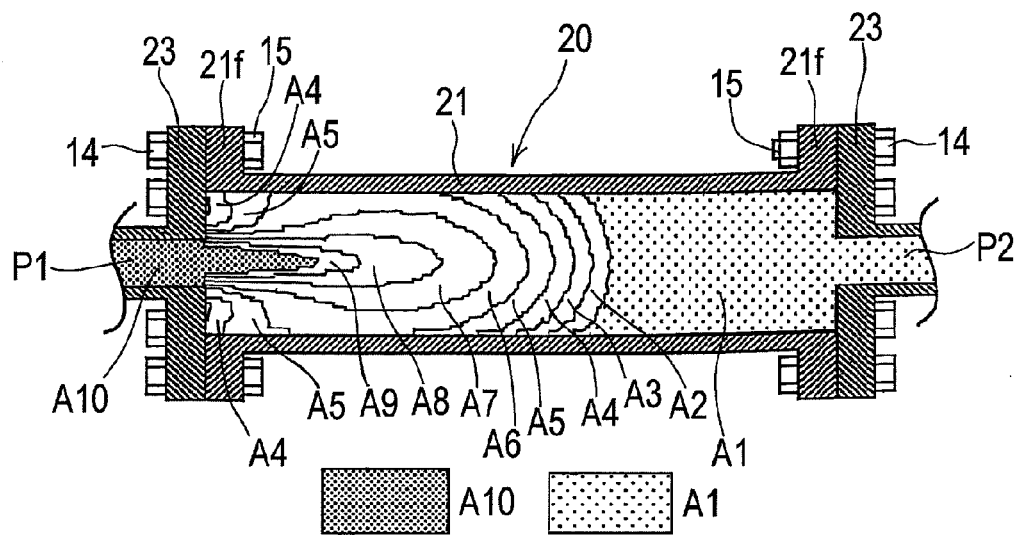
FIG. 4A is a schematic cross-sectional view showing the state of the interface between the concentrated seawater and the seawater in the case where there are no fluid passages partitioned in the chamber.
Figure 4B:
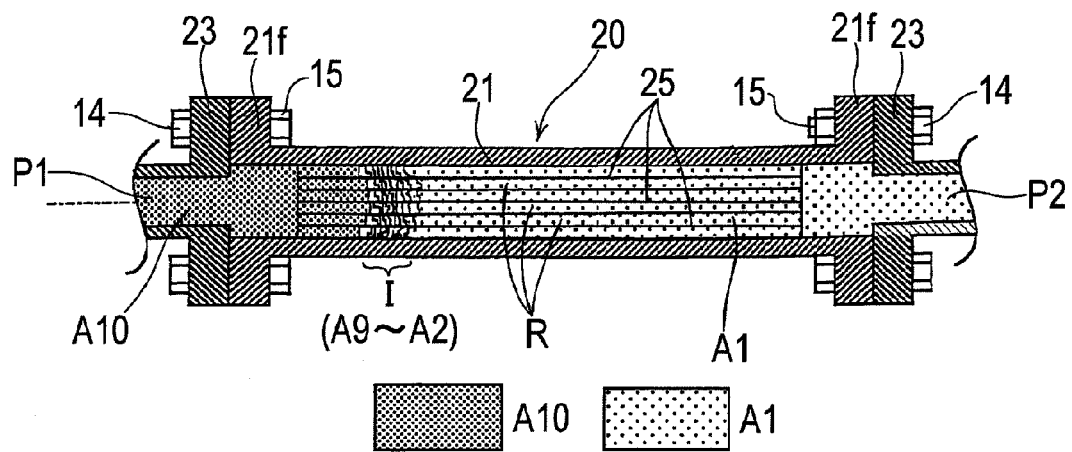
FIG. 4B is a schematic cross-sectional view showing the state of the interface between the concentrated seawater and the seawater in the case where there are a plurality of fluid passages partitioned in the chamber.

FIGS. 4A and 4B are views showing the state of mixing when the concentrated seawater flows from the concentrated seawater port into the chamber filled with the seawater, and schematic cross-sectional views showing the state of the interface between the concentrated seawater and the seawater in the case where there are a plurality of fluid passages partitioned in the chamber and in the case where there are no fluid passages partitioned in the chamber. FIG. 4A shows the state of the interface between the concentrated seawater and the seawater in the case where there is a single fluid passage in the chamber without a plurality of fluid passages partitioned in the chamber, and FIG. 4B shows the state of the interface between the concentrated seawater and the seawater in the case where there are a plurality of fluid passages partitioned in the chamber.

In FIGS. 4A and 4B, the area shown by A10 is an area where the concentrated seawater is contained in the range of 100% to 90%, and the concentration of the concentrated seawater is becoming low in increments of 10% in each of the areas (A9-A2) from the concentrated seawater port P1 toward the seawater port P2. Then, the area shown by A1 is an area where the concentrated seawater is contained in the range of 10% to 0%. Also, in the area shown by A1, the concentrated seawater is contained by 10% in the interface portion between the area A1 and the area A2 or the portion close to the area A2, and the concentrated seawater is contained by 0% in the portion close to the seawater port P2, i.e., the seawater is contained by 100%.

As shown in FIG. 4A, in the case where there are no fluid passages partitioned in the chamber, the concentrated seawater which has flowed in the chamber from the concentrated seawater port P1 diffuses in the seawater which has sucked from the seawater port P2, and the concentrated seawater and the seawater are mixed with each other over a wide range. Also, in the case where the seawater is sucked from the seawater port P2, similarly, the seawater diffuses in the concentrated seawater. This is because when the respective fluids flow in the chamber, as shown in the respective areas of A9 to A2, vortexes are formed and the fluids diffuse widely.

In contrast, as shown in FIG. 4B, in the case where there are a plurality of fluid passages R partitioned in the chamber, the concentrated seawater flows from the concentrated seawater port P1 into the respective partitioned fluid passages R having a small cross-sectional area, and the seawater flows from the seawater port P2 into the respective fluid passages R. At this time, the concentrated seawater and the seawater are brought into contact with each other in the respective fluid passages R. However, because vortexes generated in the fluid passage R having a small cross-sectional area become small vortexes in the conduit, the concentrated seawater and the seawater do not diffuse widely and the interface I (areas shown by A9 to A2) between the concentrated seawater and the seawater is not disturbed.

Specifically, in FIG. 4B, the area shown by A10 is an area where the concentrated seawater is contained in the range of 100% to 90%, and the concentration of the concentrated seawater is becoming low in increments of 10% in each of the areas (A9-A2) from the concentrated seawater port P1 toward the seawater port P2. Then, the area shown by A1 is an area where the concentrated seawater is contained in the range of 10% to 0%. When viewed from the concentrated seawater port P1 in the direction of the seawater port P2, the percentage of the concentrated seawater decreases in increments of 10% from the area A9, adjacent to the area A10, where the concentrated seawater is contained in the range of 90% to 80%, and the interface between the concentrated seawater and the seawater is aggregation of eight small belt-like areas from the area A9 where the concentrated seawater is contained in the range of 90% to 80% to the area A2 where the concentrated seawater is contained in the range of 20% to 10%, i.e., such aggregation is shown by the interface I.

In this manner, a plurality of fluid passages R having a small cross-sectional area are assembled to form a large chamber, and thus the interface I between the concentrated seawater and the seawater is maintained in each of the fluid passages R. As a whole, while the interface between the concentrated seawater and the seawater is maintained, i.e., while mixing of the concentrated seawater and the seawater is suppressed, the seawater is pressurized and discharged by the concentrated seawater.

According to the present invention, as shown in FIG. 4B, even if there is no piston in the chamber, by providing a plurality of fluid passages R partitioned in the chamber, energy exchange can be performed while being nearly divided into the concentrated seawater and the seawater.

Figure 5:
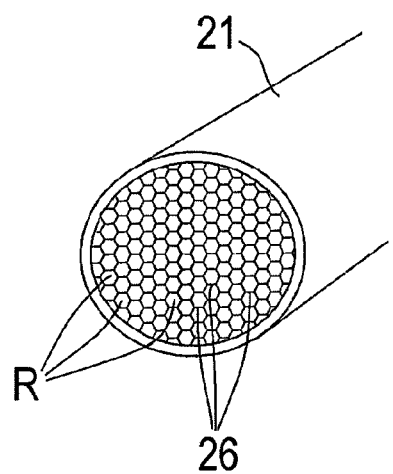
FIG. 5 is a perspective view showing another embodiment of an energy exchange chamber according to the present invention.

FIG. 5 is a perspective view showing another embodiment of an energy exchange chamber according to the present invention. In the embodiment shown in FIGS. 2 and 3, a plurality of fluid passages partitioned in the chamber are constructed by the small tubes 25. However, in the embodiment shown in FIG. 5, partitions 26 are provided in the chamber formed in the cylinder 21 to form a plurality of honeycomb-like fluid passages R. Not only honeycomb-like fluid passages but also lattice-like fluid passages may be formed. In this manner, also in the case where a plurality of honeycomb-like fluid passages or lattice-like fluid passages R are formed, vortexes generated in each of the fluid passages R become small vortexes in the conduit, and hence the concentrated seawater and the seawater do not diffuse widely and the interface between the concentrated seawater and the seawater is not disturbed. Thus, the energy exchange chamber shown in FIG. 5 has the same function and effect as that of the example shown in FIGS. 2 and 3.

It is desirable that the tube 25 and the honeycomb-like or lattice-like partition 26 are thin. As the size of the tube 25 or the partition 26 is smaller, the concentrated seawater and the seawater are less mixed. However, because resistance becomes larger, the diameter of the tube is preferably in the range of 5 to 10 mm. In the case of honeycomb, opposite side distance of hexagon is preferably in the range of 5 to 10 mm. In the case of lattice, opposite side distance of square is preferably in the range of 5 to 10 mm.

Figure 6:
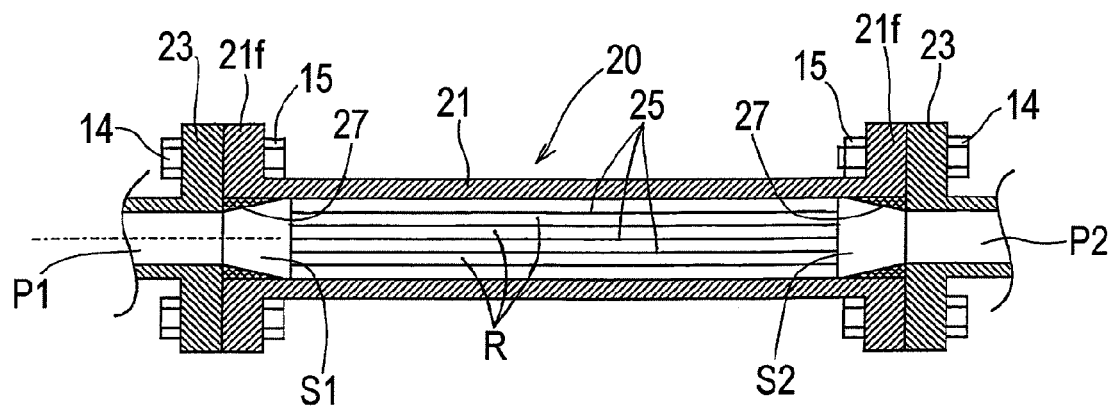
FIG. 6 is a cross-sectional view showing an embodiment in which a flow regulator is provided in the energy exchange chamber shown in FIG. 2.

FIG. 6 is a cross-sectional view showing an embodiment in which a flow regulator is provided in the energy exchange chamber 20 shown in FIG. 2. As shown in FIG. 6, a space S1 is provided between the concentrated seawater port P1 and the fluid passages R and a space S2 is provided between the seawater port P2 and the fluid passages R, and flow regulators 27, 27 for regulating flow of the fluid when the fluid flows into the respective spaces S1, S2 are provided. The flow regulator 27 comprises a conical flow-regulating plate which flares out from the port having a small diameter toward the cylindrical portion in the chamber having a large diameter.

Figure 7:
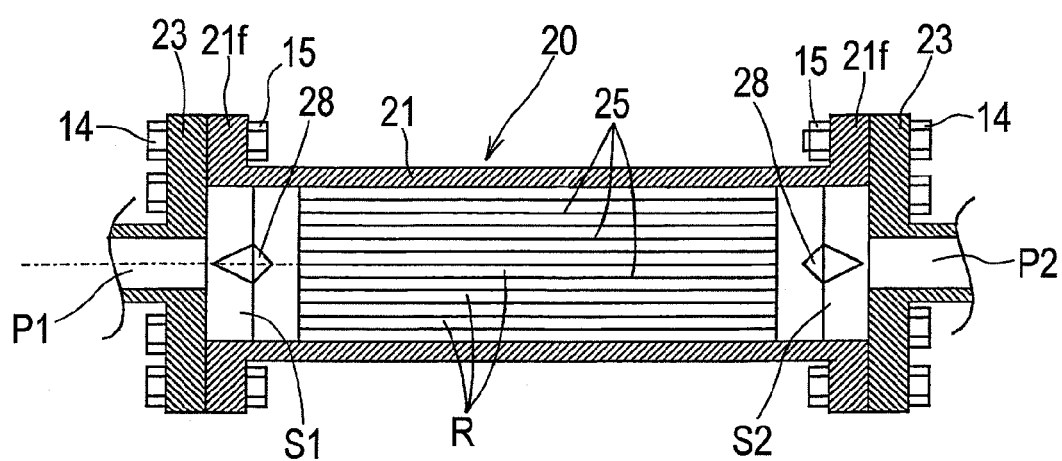
FIG. 7 is a cross-sectional view showing an embodiment in which another flow regulator is provided in the energy exchange chamber.

FIG. 7 is a cross-sectional view showing an embodiment in which another flow regulator is provided in the energy exchange chamber 20. In the energy exchange chamber 20 shown in FIG. 7, the inner diameter of the chamber is much larger than the diameters of the concentrated seawater port P1 and the seawater port P2, compared to the energy exchange chamber 20 shown in FIG. 2.

In the embodiment shown in FIG. 7, flow regulators 28, 28 are provided at the central portions of the spaces S1, S2 in the chamber, the regulator 28 having cones whose bottom surfaces join so that the outer diameter is enlarged and is then contracted from the inflow side. The flow regulator 28 allows the fluid supplied from the port to the central portion of the chamber to spread outward once and to contract inward again, and thus the fluid supplied from the port having a small diameter can flow uniformly into the respective fluid passages partitioned in the chamber.

The conical flow-regulating plate shown in FIG. 6 which flares out from the port having a small diameter toward the cylindrical portion in the chamber having a large diameter is effective in the case where the ratio of the inner diameter of the port to the inner diameter of the chamber is relatively small, i.e., in the case where the enlargement range from the port to the chamber is small. As shown in FIG. 7, in the case where the ratio of the inner diameter of the port to the inner diameter of the chamber is large, i.e., in the case where the enlargement range from the port to the chamber is large, the flow regulator 28 according to the present embodiment is effective.

Figure 8:
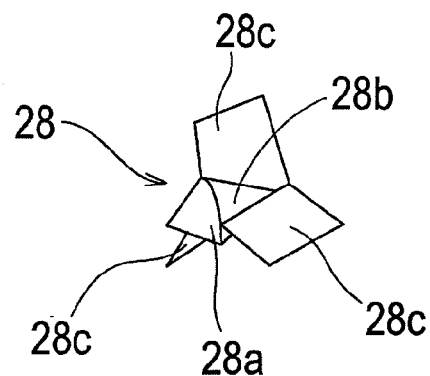
FIG. 8 is a perspective view of the flow regulator shown in FIG. 7.

FIG. 8 is a perspective view of the flow regulator 28 shown in FIG. 7. As shown in FIG. 8, the flow regulator 28 has such a shape as to join the corn 28a whose outer diameter is enlarged from the left side to the right side and the corn 28b whose outer diameter is contracted from the left side to the right side at their bottom surfaces. The flow regulator 28 has a plurality of support plates 28c attached to the conical member in order to hold the flow regulator 28 at the central portion of the chamber, and these support plates 28c are fixed to the inner wall of the chamber.

As shown in FIGS. 6 through 8, by regulating the fluid flow so that the fluid flowing into the chamber flows equally in the respective fluid passages R, the interface between the concentrated seawater and the seawater can divide a single space in the chamber into two spaces. The direction of the flow is changed by the directional control valve or the valve, and the interface between the concentrated seawater and the seawater is reciprocated between the concentrated seawater port P1 and the seawater port P2.

Figure 9:
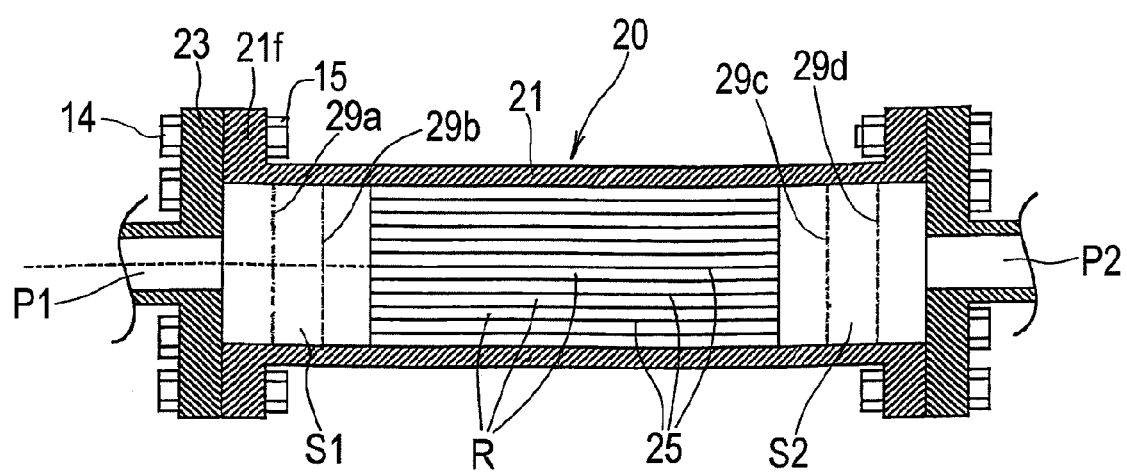
FIG. 9 is a cross-sectional view showing an embodiment in which still other flow regulator is provided in the energy exchange chamber.

FIG. 9 is a cross-sectional view showing a configuration of an energy exchange chamber 20 according to still other embodiment of the present invention. In the embodiment shown in FIG. 9, other flow regulators are provided. A space S1 is provided between the concentrated seawater port P1 and the fluid passages R and a space S2 is provided between the seawater port P2 and the fluid passages R, and flow regulators 29a, 29b, 29c and 29d for regulating flow of the fluid when the fluid flows into the respective space S1, S2 are provided.

Figure 10:
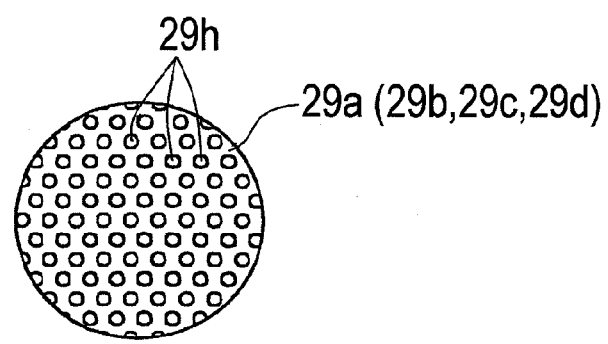
FIG. 10 is a plan view of the flow regulator shown in FIG. 9.

FIG. 10 is a plan view of the flow regulator shown in FIG. 9. As shown in FIG. 10, the flow regulator 29a (29b, 29c, 29d) comprises a porous plate having a number of holes 29h formed in a circular disk-shaped member. The porous plates are away from the ports P1, P2 at a predetermined distance, and the adjacent porous plates are away from each other at a predetermined distance. Further, the porous plate is disposed so as to be away from the end portions of the partitioned fluid passages at a certain distance.

The present embodiment shown in FIG. 9 also is effective in the case where the ratio of the inner diameter of the port to the inner diameter of the chamber is large. In this manner, by providing the porous plates, the fluid flowing from the ports P1, P2 having a small diameter can be spreaded uniformly in the chamber having a large diameter to cause the fluid to flow equally in a plurality of partitioned fluid passages.

The porous plate shown in FIG. 10 comprises a perforated plate having a number of holes 29h formed in a circular disk-shaped member. A porosity with respect to an entire area of the plate can be calculated by a diameter of a hole and a pitch between holes in the perforated plate. A numerical value of the porosity is selected so that the porous plate does not cause a great pressure loss and has an excellent flow-regulating function.

Further, the flow regulators 29a, 29b (or 29c, 29d) comprising two porous plates provided at one port side may have different hole diameters and different porosities.

Figure 11:
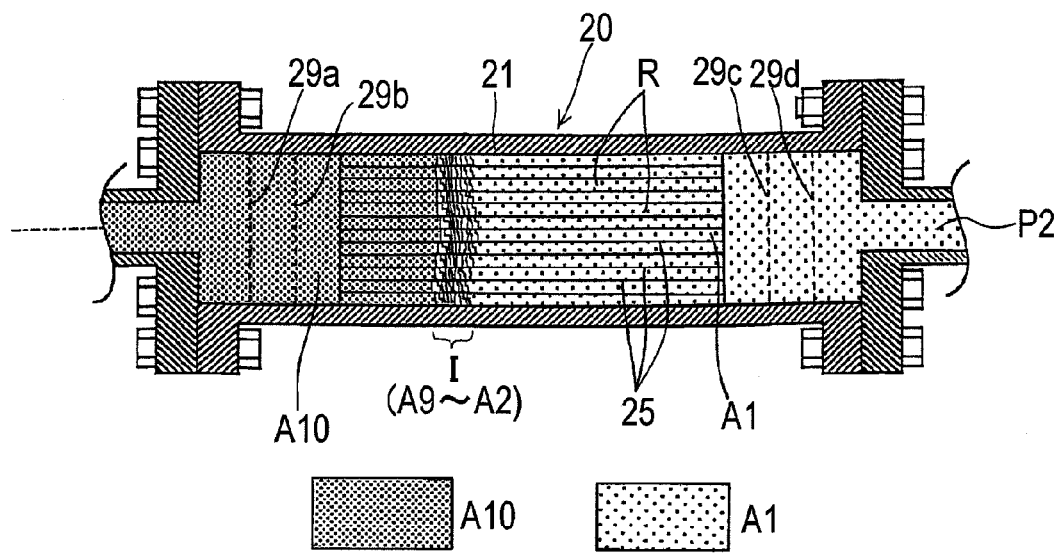
FIG. 11 is a schematic cross-sectional view showing the state of the interface between the concentrated seawater and the seawater in the embodiment shown in FIG. 9.

FIG. 11 is a view showing the state of mixing when the concentrated seawater flows from the concentrated seawater port P1 into the energy exchange chamber 20 filled with the seawater in the embodiment shown in FIG. 9, and a schematic cross-sectional view showing the state of the interface between the concentrated seawater and the seawater. In FIG. 11, the area shown by A10 is an area where the concentrated seawater is contained in the range of 100% to 90%, and the concentration of the concentrated seawater is becoming low in increments of 10% in each of the areas from the concentrated seawater port P1 toward the seawater port P2. Then, the area shown by A1 is an area where the concentrated seawater is contained in the range of 10% to 0%. When viewed from the concentrated seawater port P1 in the direction of the seawater port P2, the percentage of the concentrated seawater decreases in increments of 10% from the area A9, adjacent to the area A10, where the concentrated seawater is contained in the range of 90% to 80%, and the interface between the concentrated seawater and the seawater is aggregation of eight small belt-like areas from the area A9 where the concentrated seawater is contained in the range of 90% to 80% to the area A2 where the concentrated seawater is contained in the range of 20% to 10%, i.e., such aggregation is shown by the interface I.

By using the porous plates as the flow regulators 29a, 29b, 29c and 29d, it is understood that even if the fluid passage is enlarged from the port having a small diameter to the chamber having a large diameter, the interface I between the concentrated seawater and the seawater divides the fluid into the fluid in the area A10 and the fluid in the area A1 between the two ports P1, P2 in the chamber. When the concentrated seawater is flowed further from the concentrated seawater port P1 into the chamber, the interface I moves toward a side of the seawater port P2, and the seawater pressurized to the same pressure as that of the concentrated seawater is discharged from the seawater port P2. Then, the seawater is sucked from the seawater port P2, and the concentrated seawater is discharged from the concentrated seawater port P1. At this time, similarly, the seawater which has been regulated so as to flow uniformly in the chamber by the flow regulators 29c, 29d comprising two porous plates located at a side of the seawater port P2 spreads uniformly and flows into the respective tubes 25 (fluid passages R) comprising small conduits. Thus, turbulent flow diffusion is suppressed by the small conduits, and the concentrated seawater is discharged while mixing of the two fluids is minimized by the interface I.

Figure 12:
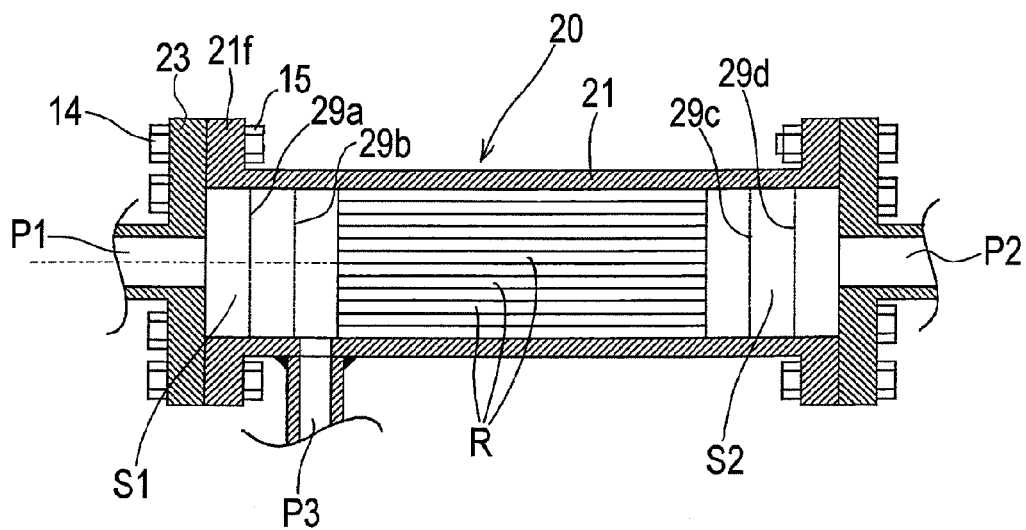
FIG. 12 is a schematic cross-sectional view showing an embodiment in which a concentrated seawater discharge port is provided in the energy exchange chamber shown in FIG. 9.

FIG. 12 is a schematic cross-sectional view showing an embodiment in which a concentrated seawater discharge port is provided in the energy exchange chamber having the fluid passages comprising small conduits and the four flow regulators comprising porous plates shown in FIG. 9. In FIG. 12, the concentrated seawater discharge port P3 is provided in the wall of the cylinder 21 between the small conduits at a side of the concentrated seawater port P1 and the flow regulator 29b comprising a porous plate.

In the process where the seawater is sucked in the chamber, the concentrated seawater is discharged from the concentrated seawater discharge port P3, and the fluid in the mixing area of the concentrated seawater and the seawater is discharged from the concentrated seawater discharge port P3 just before the flow regulator 29b. Specifically, the fluid in the mixing area is discharged just before the flow regulator 29b, and then the concentrated seawater is supplied from the concentrated seawater supply port P1 when the seawater is pushed out by the concentrated seawater again. In this manner, by discharging the fluid in the mixing area from the chamber, a new interface is always formed, and acceleration of mixing of the concentrated seawater and the seawater by reciprocation of the interface can be prevented.

The time of the suction process may be prolonged once in several cycles of suction and discharge, and the fluid in the mixing area may be discharged from the concentrated seawater discharge port P3.

Figure 13:
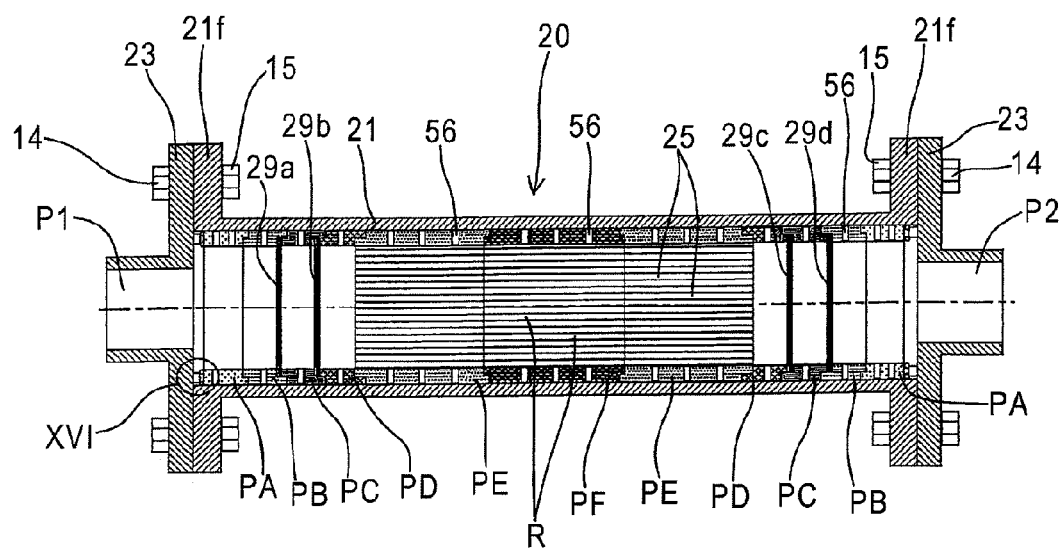
FIG. 13 is a view showing a concrete example of the case where flow regulators and tubes are disposed in a cylinder in the energy exchange chamber according to the present invention, and a cross-sectional view of the energy exchange chamber.
Figure 14:
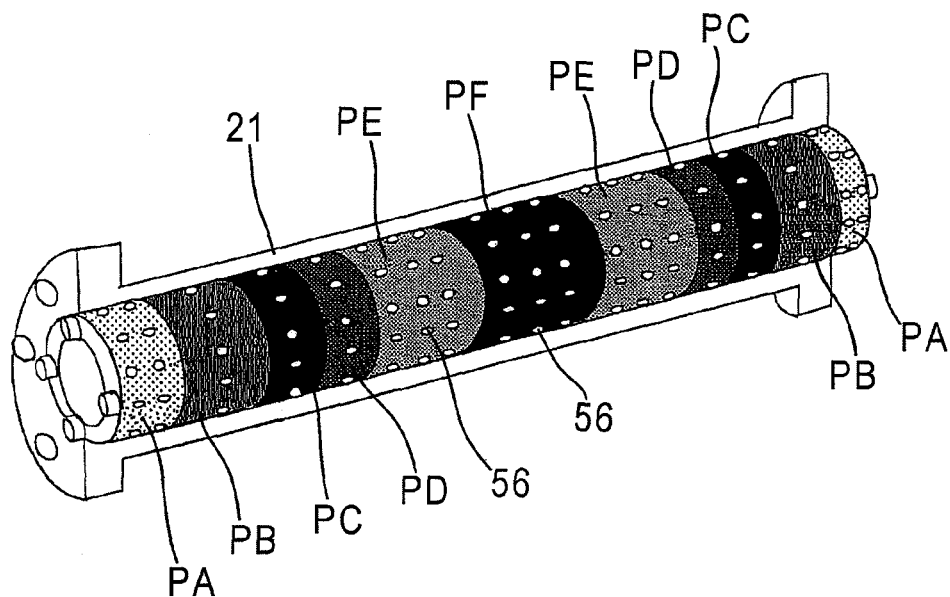
FIG. 14 is a view showing a concrete example of the case where flow regulators and tubes are disposed in a cylinder in the energy exchange chamber according to the present invention, and a perspective view showing an interior of the cylinder by eliminating approximately half of the cylinder.

FIGS. 13 and 14 are views showing a concrete example of the case where the flow regulators 29a, 29b, 29c and 29d and the tubes 25 are disposed in the cylinder 21 in the energy exchange chamber 20 according to the present invention. FIG. 13 is a cross-sectional view of the energy exchange chamber 20, and FIG. 14 is a perspective view showing an interior of the cylinder 21 by eliminating approximately half of the cylinder 21.

As shown in FIGS. 13 and 14, a pipe PA, a pipe PB, a pipe PC, a pipe PD, a pipe PE, a pipe PF, a pipe PE, a pipe PD, a pipe PC, a pipe PB, and a pipe PA are disposed in this order from a side of the concentrated seawater port P1 toward a side of the seawater port P2 in the cylinder 21 of the energy exchange chamber 20. These pipes PA-PF are used as members for fixing the flow regulators 29a-29d and the tubes 25 to the chamber. The pipe PA, the pipe PB, the pipe PC, the pipe PD, and the pipe PE are disposed symmetrically with respect to the central pipe PF. The flow regulator 29a is sandwiched between the pipe PB and the pipe PC, and the flow regulator 29b is sandwiched between the pipe PC and the pipe PD. Further, the flow regulator 29c is sandwiched between the pipe PC and the pipe PD, and the flow regulator 29d is sandwiched between the pipe PB and the pipe PC.

Figure 15:
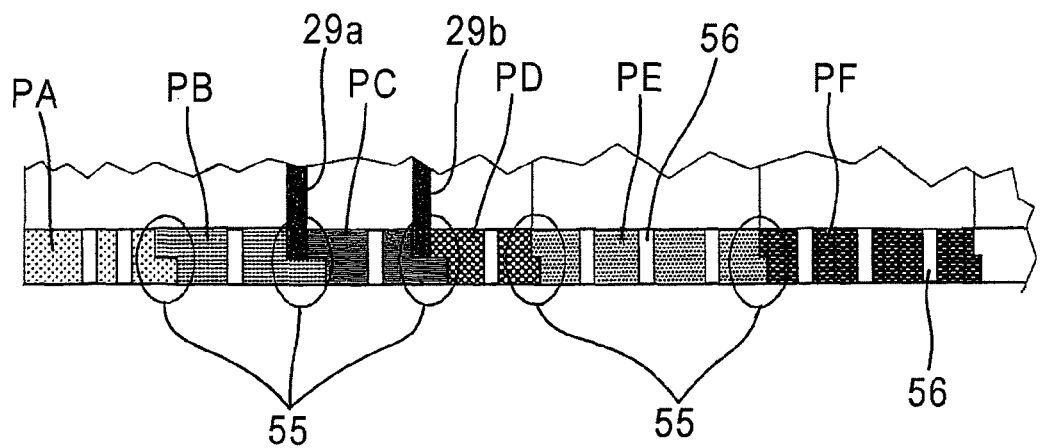
FIG. 15 is an enlarged view of an essential part of FIG. 13.

FIG. 15 is an enlarged view of an essential part of FIG. 13. As shown in FIG. 15, the pipe PA, the pipe PB, the pipe PC, the pipe PD, the pipe PE, and the pipe PF have concavo-convex shapes on their outer ends in their axial directions, and the adjacent pipes are fitted with each other and connected to each other at the concavo-convex portions 55.

The flow regulators 29a, 29b (29c, 29d) are disposed so as to be sandwiched at clearances of the concavo-convex portions 55 between the pipe PB and the pipe PC and between the pipe PC and the pipe PD, and are fixed in the axial direction.

Further, as shown in FIG. 13, the tubes 25 are disposed in the pipe PF and the two pipes PE. As a fixing method of the tubes 25, various methods such as adhesion or screw clump from a circumferential direction side of the pipe may be considered. In short, any fixing method may be used as long as the tubes 25 are fixed so as not to move axially in the pipes PE and PF.

In the example shown in FIG. 13, each of the tubes 25 is axially divided into three pieces and is then disposed in the chamber. The division number of the tube, the axial length of the tube, and the inner and outer diameter of the tube may be suitably set according to usage conditions, and thus the configuration is not limited to the configuration (three divisions) shown in FIG. 13.

Each of the pipes PA-PF has a pressure balance hole 56 at a location on its outer circumferential surface or pressure balance holes 56 at a plurality of locations on its outer circumferential surface. The diameter of the pressure balance hole 56, and the number of the pressure balance holes 56 in an axial direction and a circumferential direction of the pipe may be suitably set.

Figure 16:
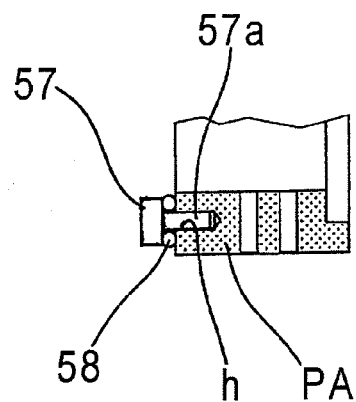
FIG. 16 is an enlarged cross-sectional view of XVI section of FIG. 13.

FIG. 16 is an enlarged cross-sectional view of XVI section of FIG. 13. As shown in FIG. 16, a fixing washer 57 is provided at the end portion of the pipe PA. The fixing washer 57 has a shaft portion 57a, and the shaft portion 57a is fitted into a hole h formed in the end portion of the pipe PA. An O ring 58 is provided between the fixing washer 57 and the end surface of the pipe PA.

The shaft portion 57a of the fixing washer 57 is axially movable in the hole h, and the depth of the hole h and the length of the shaft portion 57a are set to allow the fixing washer 57 to be axially movable by a desired distance. The fixing washer 57 is provided also on another pipe PA located at the symmetric position of the pipe PA shown in FIG. 16 (see FIG. 13).

As shown in FIGS. 13 and 16, the fixing washers 57 which are axially movable by elastic deformation of the O rings 58 are provided at the end portions of the pipes PA, and the pipes PA-PF can be fixed axially in the chamber by pressing the fixing washers 57 with the flanges 23.

As described above, the energy exchange chamber shown in FIGS. 13 through 16 employs the following configurations (1)-(3).

(1) Installation of the Divided Tubes

The energy exchange chamber according to the present invention has various sizes (lengths) depending on usage conditions. For example, the length of the chamber may be 1 m, or may be 8 m. Further, the tube provided in the chamber is required to have a length approximately equal to the chamber. However, it is difficult to manufacture the long tube, or the production cost of such long tube becomes expensive. In addition, in order to install such long tubes in the chamber, a large working space is necessary.

According to the present invention, as shown in FIG. 13, by employing the configuration of the axially divided tube, the above problems can be solved.

(2) Installation of Pressure Balance Hole

In order to install the pipe PA, the pipe PB, the pipe PC, the pipe PD, the pipe PE and the pipe PF in the energy exchange chamber, a small gap (clearance) is provided in a radial direction between the chamber and the pipes PA-PF.

There is a possibility that the internal pressure of the energy exchange chamber (pipes PA-PF) becomes a high pressure of 8 MPa or higher at the maximum. Therefore, there is a high possibility that the pipes PA-PF expand in a radial direction within a range of the above gap in the radial direction. In addition, the internal pressure changes periodically from a low pressure to a high pressure or from a high pressure to a low pressure. Thus, there is a possibility that repetition of expansion and contraction of the pipe caused by periodical change of the internal pressure accelerates deterioration of the pipe and causes fatigue failure.

According to the present invention, by providing the pressure balance hole 56 in each pipe, the internal pressure and the external pressure of the pipe can be equivalent to cancel out the force applied to the pipe, and thus the above problems can be solved.

(3) Installation of Fixing Washer and O Ring

The direction of the flow of the fluid in the energy exchange chamber changes periodically from left to right or from right to left in FIG. 13. Specifically, the pipe PA, the pipe PB, the pipe PC, the pipe PD, the pipe PE, and the pipe PF are forced to move axially by the flow of the fluid if the pipes are not fixed axially in the chamber. If the respective pipes move axially, the flow of the fluid which has been regulated by the flow regulators 29a, 29b, 29c and 29d is disturbed, and thus there is a possibility that a proper interface between the concentrated seawater and the seawater is not formed to impair function of the equipment.

Further, there is a possibility that the outer circumferences of the respective pipes are axially rubbed against the inner surface of the chamber and abrasion powder is produced by frictional wear of the parts. Then, there is a possibility that the produced abrasion powder flows in the structural equipment of the system to impair function of the entire system.

According to the present invention, by using the fixing washers 57 and the O rings 58, after the pipe PA, the pipe PB, the pipe PC, the pipe PD, the pipe PE, and the pipe PF are installed in the chamber, the flanges 23 are fixed to the cylinder 21. At this time, the end surface of the flange 23 at the chamber side is brought into contact with the end surface of each of the fixing washers 57 at the flange side, thereby fixing the pipe PA, the pipe PB, the pipe PC, the pipe PD, the pipe PE, and the pipe PF axially so as to be sandwiched by the right and left flanges 23, 23. At this time, the pipe PA, the pipe PB, the pipe PC, the pipe PD, the pipe PE, and the pipe PF are fixed by elastic deformation of the O rings 58 and their repulsive forces. The number of the fixing washers 57 and the O rings 58 is suitably set according to usage conditions.

Although the O rings are used in this embodiment, this fixing means is not limited to the O rings as long as axial elastic force is produced according to installation conditions. Springs or the like may be used.

According to the present invention, the respective pipes are fixed axially in the energy exchange chamber by using the fixing washers and the O rings, or springs, and thus the above problems can be solved.

The energy exchange chamber 20 shown in FIGS. 13 through 16 offers the following function and effect.
(i) By removably providing the pipe having approximately the same outer diameter as the inner diameter of the chamber in the chamber, the tube itself can be easily replaced.
(ii) When the tubes are installed in the chamber as a pressure-resistant container, only the pipe in which the tubes are installed is fitted as a separate piece into the chamber without applying machining, welding, adhesion, and the like to the chamber. Thus, the structure becomes simple.
(iii) By providing a step portion (concavo-convex portion) in the pipe, the flow regulator comprising a porous plate is attached in the circumferential groove formed by providing a gap in the step portion. Therefore, the step is not provided in the flow along the inner circumferential portion of the chamber, and a separate support member is not required. Thus, uniform flow can be formed downstream of the porous plate.

In the embodiment shown in FIGS. 13 through 16, an example in which the tubes 25 are disposed in the pipes PE and PF is shown. However, a plurality of honeycomb-like fluid passages may be formed by providing the partitions shown in FIG. 5 in the pipes PE and PF. In this case also, needless to say, the pipes PE and PF in which the fluid passages are formed are installed in the energy exchange chamber 20.

Figure 17:
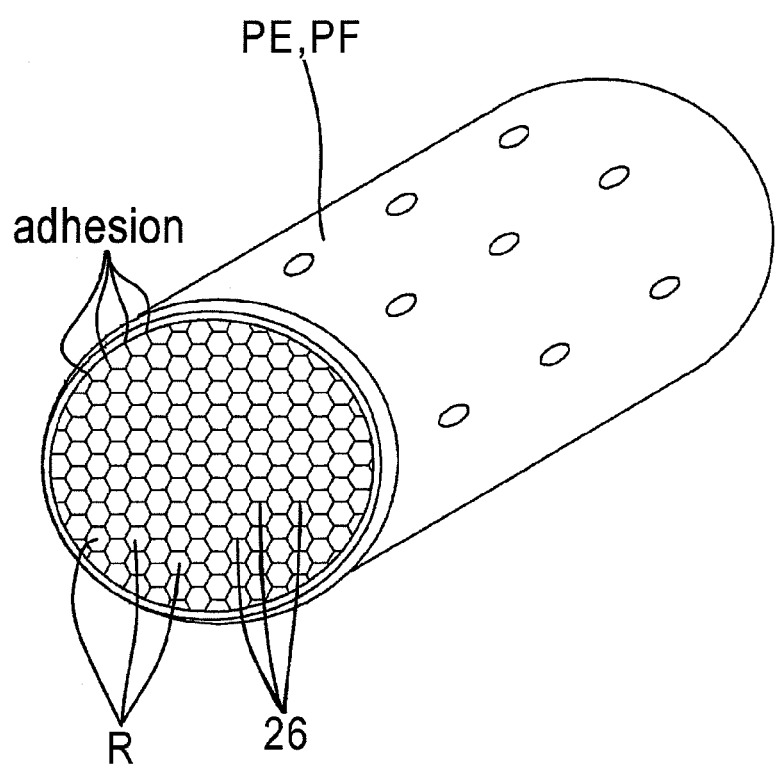
FIG. 17 is a perspective view showing an example in which a plurality of honeycomb-like fluid passages are formed by providing partitions shown in FIG. 5 in the pipes.

FIG. 17 is a perspective view showing an example in which a plurality of honeycomb-like fluid passages R are formed by providing partitions 26 shown in FIG. 5 in the pipes PE and PF. As shown in FIG. 17, hexagonal holes of honeycomb are cylindrically processed in a direction for allowing the concentrated seawater port and the seawater port to communicate with each other, and the honeycomb is fitted into the pipes PE and PF to allow the inner circumferences of the pipes to be brought into line contact with the processed portions of the honeycomb. These line contact portions are bonded by adhesive material to form a plurality of fluid passages R. In place of the honeycomb, lattice-like fluid passages may be formed.

Figure 18:
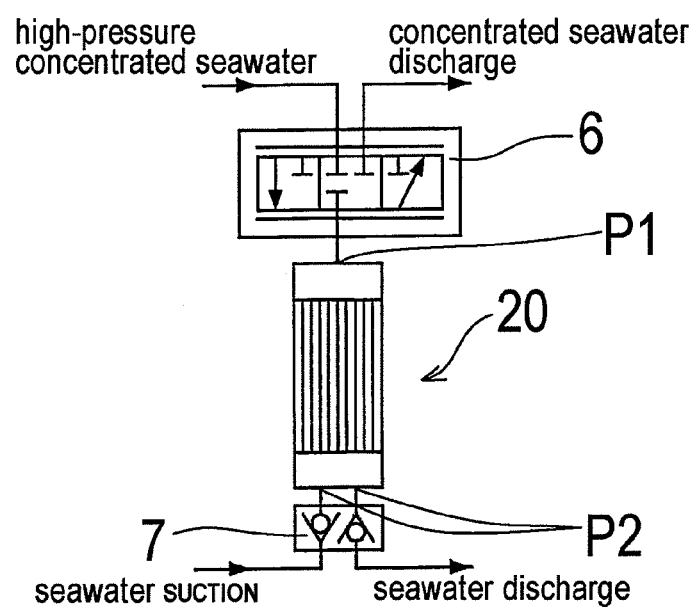
FIG. 18 is a circuit diagram which concretely shows a configuration of the directional control valve for switching introduction of the concentrated seawater into the energy exchange chamber and discharge of the concentrated seawater from the energy exchange chamber and a configuration of the valve for supplying the intake seawater to the energy exchange chamber and discharging the intake seawater from the energy exchange chamber.

FIG. 18 is a circuit diagram which concretely shows a configuration of the directional control valve 6 for switching introduction of the concentrated seawater into the energy exchange chamber 20 and discharge of the concentrated seawater from the energy exchange chamber and a configuration of the valve 7 for supplying the intake seawater to the energy exchange chamber 20 and discharging the intake seawater from the energy exchange chamber 20. The directional control valve 6 comprises a three-way valve having a supply port, a control port and a return port, and serves as a control valve which can adjust an opening degree of the valve arbitrarily in response to external signals. Further, the valve 7 comprises a check valve module having two check valves.

Figure 19:
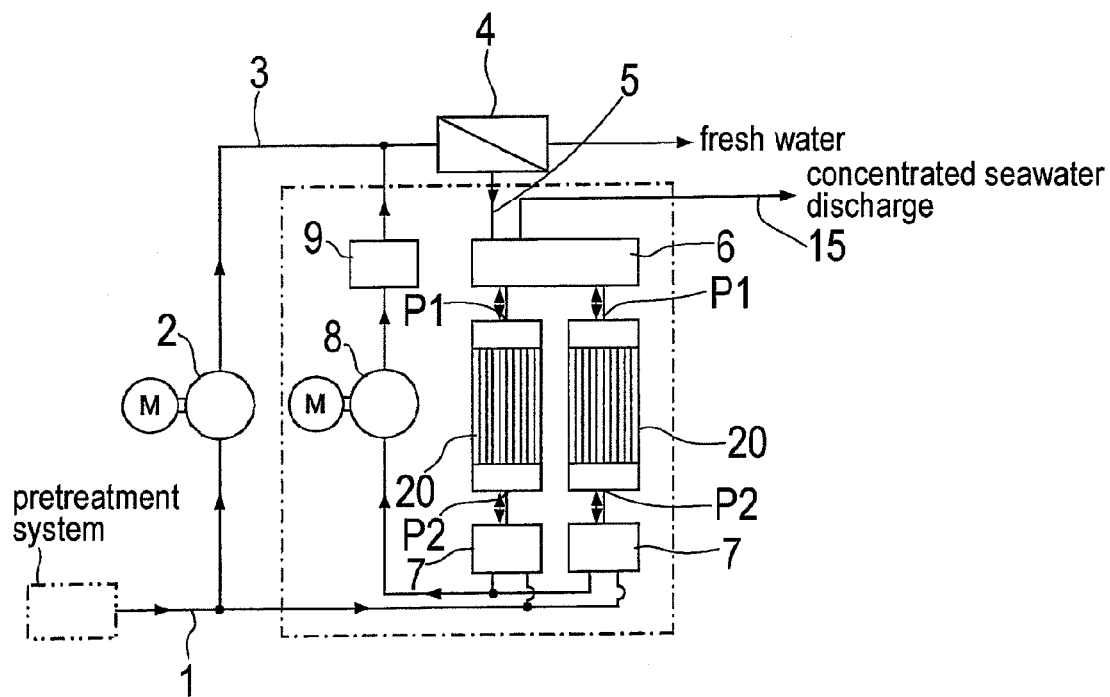
FIG. 19 is a schematic view showing a configuration example of a seawater desalination system having two energy exchange chambers according to the present invention.

FIG. 19 is a schematic view showing a configuration example of a seawater desalination system having two energy exchange chambers according to the present invention. The high-pressure concentrated seawater from the reverse-osmosis membrane-separation apparatus 4 is supplied to the directional control valve 6 in the same manner as the seawater desalination system shown in FIG. 1. In the present embodiment, the directional control valve 6 comprises a four-way valve having two output ports and operates to supply the concentrated seawater to one of the two energy exchange chambers 20 and simultaneously to discharge the concentrated seawater from the other of the energy exchange chambers 20. The valve 7 provided in the seawater port P2 is the same as that shown in FIGS. 1 and 18.

According to the present embodiment, by using the four-way valve as the directional control valve 6, the concentrated seawater is supplied alternately to the two energy exchange chambers 20 and the pressurized seawater is discharged alternately form the two energy exchange chambers 20. Therefore, the flow rate of fresh water obtained from the reverse-osmosis membrane-separation apparatus 4 can be stably maintained.

Figure 20A:
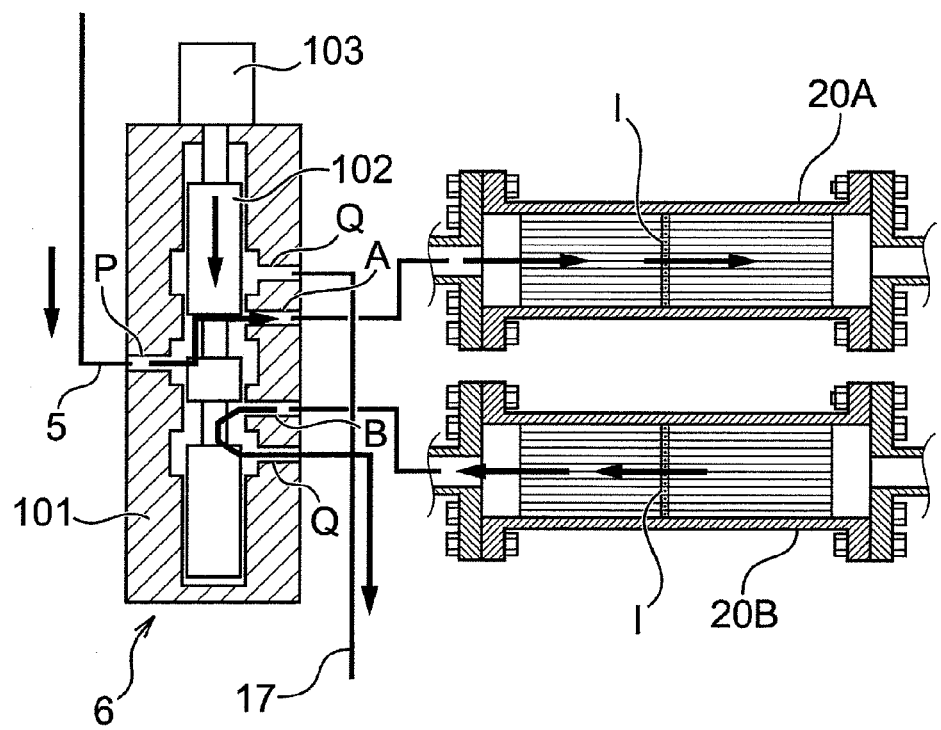
FIG. 20A is a schematic cross-sectional view showing the relationship between the directional control valve and the two energy exchange chambers in the seawater desalination system shown in FIG. 19.
Figure 20B:
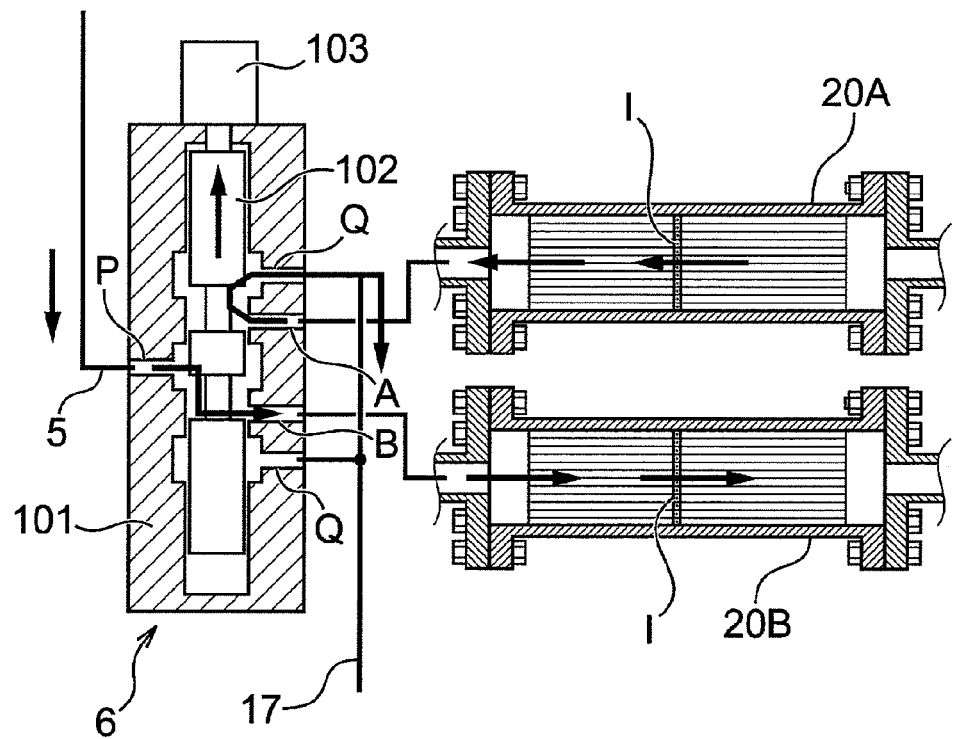
FIG. 20B is a schematic cross-sectional view showing the relationship between the directional control valve and the two energy exchange chambers in the seawater desalination system shown in FIG. 19.

FIGS. 20A and 20B are schematic cross-sectional views showing the relationship between the directional control valve and the two energy exchange chambers in the seawater desalination system shown in FIG. 19. In FIGS. 20A and 20B, in order to distinguish the two energy exchange chambers from each other, one of the chambers is represented by 20A and the other of the chambers is represented by 20B. As shown in FIGS. 20A and 20B, the directional control valve 6 comprises a housing 101, a spool 102 and a driving unit 103, and the spool 102 is fitted into the housing 101 and is moved in the housing 101, thereby switching the fluid passages.

The directional control valve 6 has one supply port P, two control ports A, B, and two return ports Q. In the directional control valve 6 of the present invention, the supply port P communicates with the concentrated seawater line 5, the two control ports A, B communicate with the energy exchange chambers 20A, 20B, respectively, and the return ports Q communicate with the concentrated seawater discharge line 17.

The directional control valve 6 functions to introduce the high-pressure concentrated seawater which has been supplied from the reverse-osmosis membrane-separation apparatus 4 to the directional control valve 6 alternately into the energy exchange chambers 20A, 20B and to discharge the seawater in the energy exchange chambers 20A, 20B by movement of the spool 102.

In the example of the directional control valve 6 according to the embodiment shown in FIGS. 20A and 20B, the spool 102 has three lands. However, the spool may be a rotary spool or any of other spools than the structure and the configuration example shown in FIGS. 20A and 20B, insofar as the directional control valve has at least one supply port P, two control ports A, B and at least two return ports Q, and the spool is operated (the fluid passages in the control valve are switched) to bring the supply port P into fluid communication with one control port A (or B) of the two control ports and also to bring the other control port B (or A) of the two control ports into fluid communication with the return port Q.

Next, an example of directional control performed by movement of the spool 102 of the directional control valve 6 will be described.

(A) FIG. 20A shows the case where the spool 102 moves in a direction to bring the supply port P and the control port A of the directional control valve 6 into fluid communication with each other.

The high-pressure concentrated seawater is introduced via the directional control valve 6 (P port→A port) into the energy exchange chamber 20A (upper in FIG. 20A).

The interface (interface between the concentrated seawater and the seawater) I in the energy exchange chamber 20A (upper in FIG. 20A) is moved to the right in FIG. 20A.

The seawater which has been introduced via the valve 7 (see FIG. 19) into the energy exchange chamber 20A is pressurized by movement of the interface I, and the pressurized seawater is supplied via the valve 7 to the booster pump 8 (see FIG. 19).

At the same time, the control port B and the return port Q of the directional control valve 6 are brought into fluid communication with each other, and the concentrated seawater which has lost energy and has a low pressure in the energy exchange chamber 20B is discharged to the concentrated seawater discharge line 17 and the seawater is introduced from the seawater supply line 1 via the valve 7 into the energy exchange chamber 20B (lower in FIG. 20A).

(B) FIG. 20B shows the case where the spool 102 moves in a direction to bring the supply port P and the control port B of the directional control valve 6 into fluid communication with each other.

The high-pressure concentrated seawater is introduced via the directional control valve 6 (P port→B port) into the energy exchange chamber 20B (lower in FIG. 20B).

The interface I in the energy exchange chamber 20B (lower in FIG. 20B) is moved to the right in FIG. 20B.

The seawater which has been introduced via the valve 7 (see FIG. 19) into the energy exchange chamber 20B is pressurized by movement of the interface I, and the pressurized seawater is supplied via the valve 7 to the booster pump 8 (see FIG. 19).

At the same time, the control port A and the return port Q of the directional control valve 6 are brought into fluid communication with each other, and the concentrated seawater which has lost energy and has a low pressure in the energy exchange chamber 20A is discharged to the concentrated seawater discharge line 17 and the seawater is introduced from the seawater supply line 1 via the valve 7 into the energy exchange chamber 20A (upper in FIG. 20B).

Figure 21:
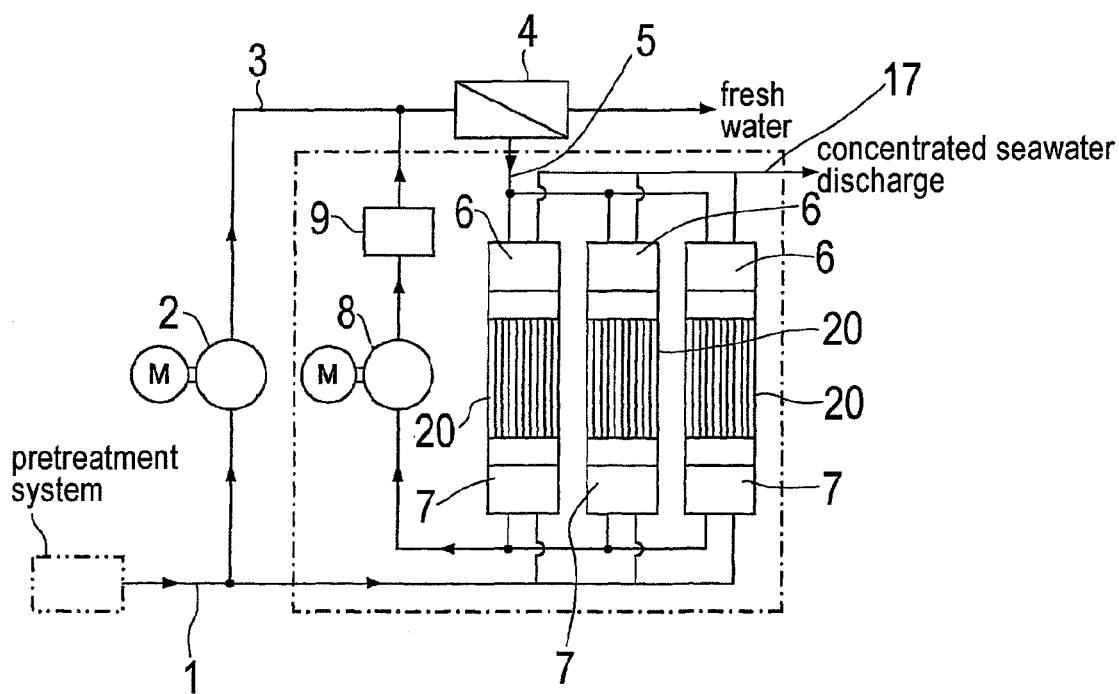
FIG. 21 is a schematic view showing a configuration example of a seawater desalination system having three energy exchange chambers according to the present invention.

FIG. 21 is a schematic view showing a configuration example of a seawater desalination system having three energy exchange chambers according to the present invention. In the present embodiment, three directional control valves 6 are provided so as to correspond to the respective concentrated seawater ports of the three energy exchange chambers 20, 20, 20, and three valves 7 are provided so as to correspond to the respective seawater ports. The three directional control valves 6 are controlled so that the timing of introduction and discharge of the concentrated seawater and the seawater in the three energy exchange chambers is staggered, and the high-pressure seawater is discharged simultaneously from the two energy exchange chambers, and at the same time, the seawater is sucked into one energy exchange chamber. In the embodiment having the two energy exchange chambers shown in FIGS. 19 and 20, since the seawater is discharged alternately from the two chambers, the discharge flow rate corresponding to one chamber can be obtained by the two chambers. However, in the present embodiment, since the three energy exchange chambers are provided, the discharge flow rate corresponding to two chambers can be obtained.

As shown in FIGS. 19 through 21, a plurality of energy exchange chambers 20 according to the present invention may be provided to construct a seawater desalination system, and the number of the energy exchange chambers 20 may be increased or decreased in proportion to the scale of available quantity of fresh water in the seawater desalination system in order to meet arbitrarily available quantity of fresh water.

In FIG. 21, the directional control valve 6 provided for the concentrated seawater port of the energy exchange chamber 20, and the valve 7 provided for the seawater port of the energy exchange chamber 20 are configured to be directly attached to the flanges of the chamber without being connected by pipes. In this manner, the number of the chambers can be easily increased, and the pipe line loss can be minimized.

Figure 22:
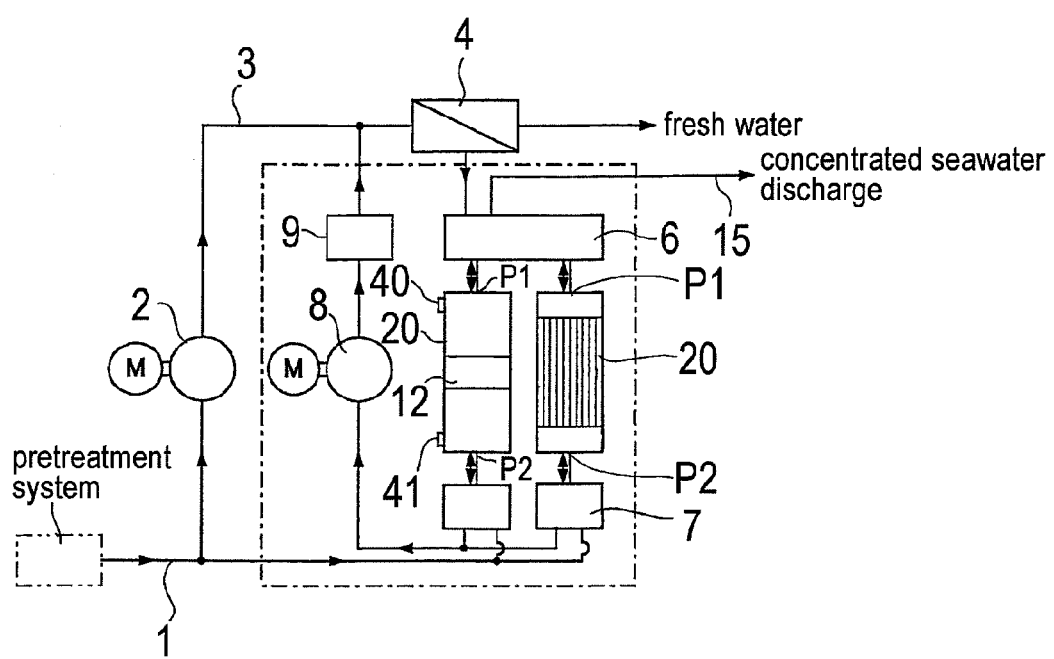
FIG. 22 is a schematic view showing a configuration example of a seawater desalination system in which the energy exchange chamber of the present invention shown in FIGS. 2 through 13 and the energy exchange chamber having the piston are provided.
Figure 26:
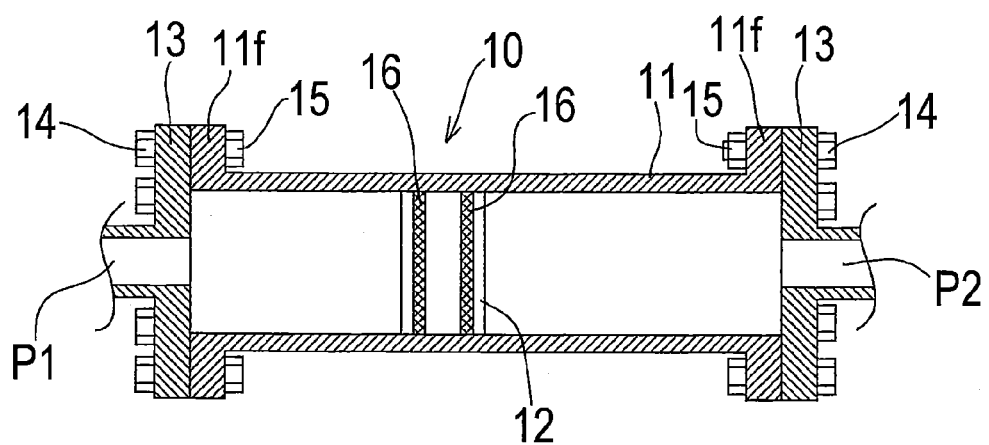
FIG. 26 is a cross-sectional view showing a configuration example of a conventional energy exchange chamber.

FIG. 22 is a schematic view showing a configuration of a seawater desalination system in which the energy exchange chamber 20 of the present invention shown in FIGS. 2 through 13 and the energy exchange chamber 10 having the piston 12 shown in FIG. 26 are provided.

The present seawater desalination system has two energy exchange chambers 20, 10, one of which comprises the energy exchange chamber 20 of the present invention shown in FIGS. 2 through 13, and the other comprises the energy exchange chamber 10 having the piston 12. A sensor 40 is attached to the location close to the concentrated seawater port P1 and a sensor 41 is attached to the location close to the seawater port P2 of the energy exchange chamber 10. The respective sensors 40, 41 can detect the presence or absence of the piston 12 at the respective locations.

Then, the respective sensors 40, 41 detect the present or absence of the piston 12, and the fluid passages of the directional control valve 6 are switched to shift the moving direction of the piston 12 on the basis of the signals of the sensors. Also, in the energy exchange chamber 20 of the present invention having no piston, supply and discharge of the concentrated seawater and the seawater are switched on the basis of the signals of the sensors. In this manner, by detecting the position of the piston 12 in one chamber 10, even if the moving velocity of the piston 12 is changed due to variation of pressure and flow rate of the concentrated seawater and the seawater, supply and discharge of water in the chamber 20 can be switched in response to such variation. Therefore, in the energy exchange chamber 20 having a plurality of fluid passages and having no piston, supply and discharge of water can be properly performed to follow variation of the system without supplying the concentrated seawater excessively or sucking the seawater excessively.

In the seawater desalination system having the three energy exchange chambers 20 shown in FIG. 21, one energy exchange chamber 20 may be replaced with the energy exchange chamber 10 having the piston.

Next, a rotary-type energy exchange chamber apparatus in which a plurality of energy exchange chambers are provided in a single cylindrical member and supply and discharge of the concentrated seawater and the seawater are performed by rotating the cylindrical member will be described.

Figure 23:
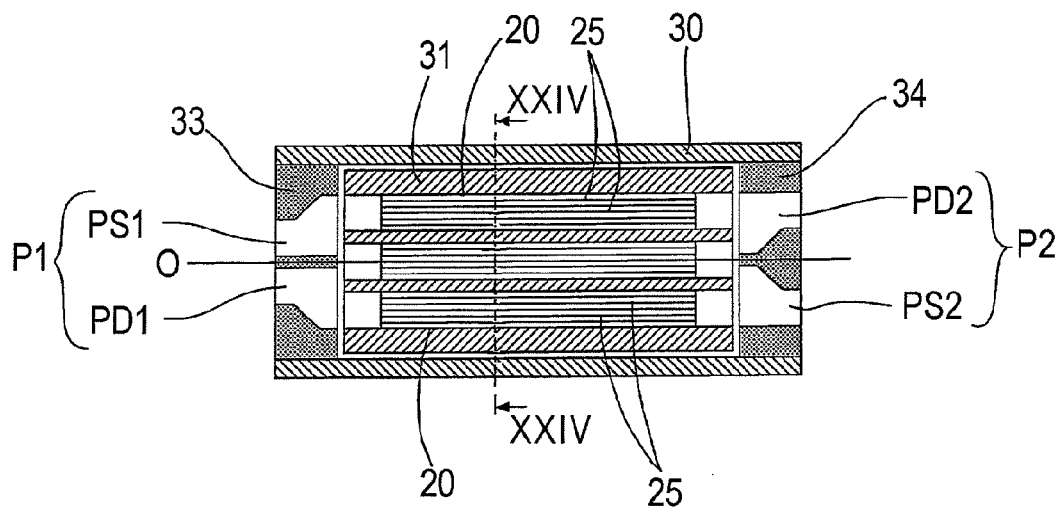
FIG. 23 is a cross-sectional view of an energy exchange chamber apparatus according to the present invention.
Figure 24:
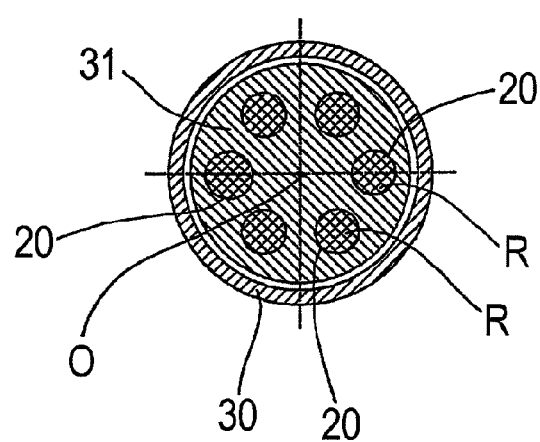
FIG. 24 is a cross-sectional view taken along line XXIV-XXIV of FIG. 23.
Figure 25:
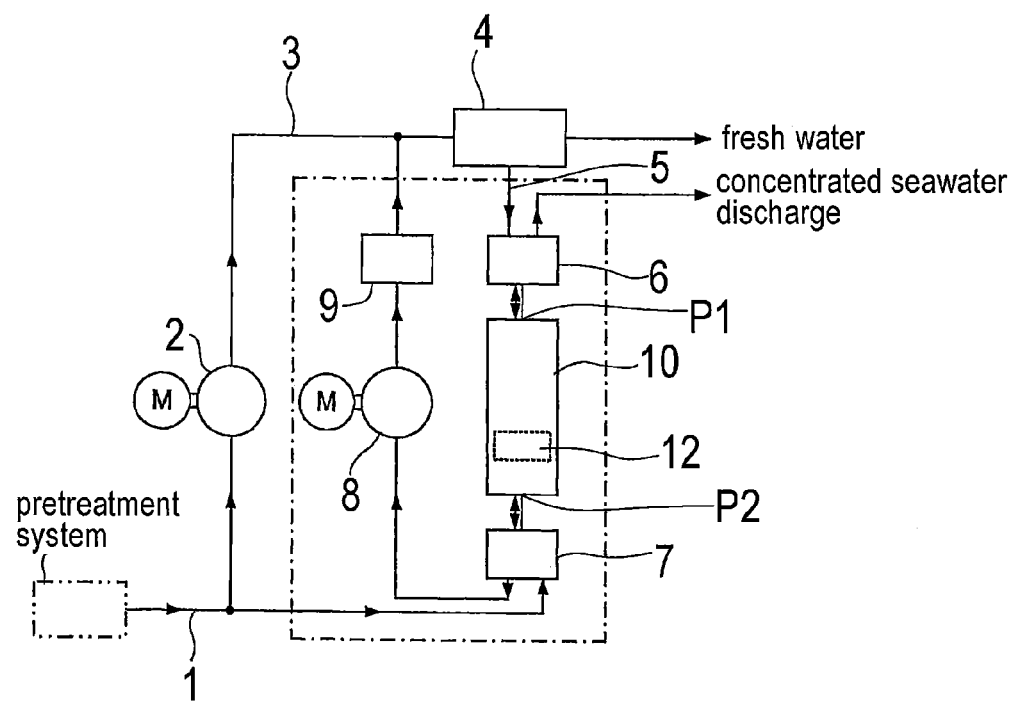
FIG. 25 is a schematic view showing a configuration example of a conventional seawater desalination system.

FIG. 23 is a cross-sectional view of the rotary-type energy exchange chamber apparatus. FIG. 24 is a cross-sectional view taken along line XXIV-XXIV of FIG. 23. As shown in FIGS. 23 and 24, the energy exchange chamber apparatus has a rotor 31 which is rotatably provided in a cylindrical casing 30. A plurality of hollow cylindrical energy exchange chambers 20 (six in the embodiment) are provided at equal angular intervals with respect to a rotating axis O of the rotor 31.

Further, port blocks 33, 34 are provided at both opening ends of the casing 30. A concentrated seawater supply port PS1 and a concentrated seawater discharge port PD1 are provided as the concentrated seawater port P1 in the port block 33. A seawater suction port PS2 and a seawater discharge port PD2 are provided as the seawater port P2 in the port block 34. When the rotor 31 is rotated about the rotating axis O, the hollow cylindrical energy exchange chambers formed at equal angular intervals with respect to the rotating axis O are rotated. Therefore, the respective chambers 20 communicate with the ports formed in the port blocks 33, 34, and the concentrated seawater supply port PS1, the concentrated seawater discharge port PD1, the seawater suction port PS2, and the seawater discharge port PD2 are switched. Operation of pressurizing and discharging the seawater by introducing the concentrated seawater into the energy exchange chamber 20 and discharging the concentrated seawater by sucking the seawater into the energy exchange chamber 20 according to the port configuration of the port blocks 33, 34 is the same as that of the energy exchange chamber 20 shown in FIGS. 1 through 22.

Also, in the energy exchange chamber 20 of the energy exchange chamber apparatus shown in FIGS. 23 and 24, a plurality of partitioned fluid passages R are formed by a plurality of tubes 25 having a small diameter which are fixed in the chamber.

In the case where the hollow cylindrical chambers formed at equal angular intervals with respect to the rotating axis O of the rotor 31 comprise simple through-holes, a problem of mixing of the concentrated seawater and the seawater in the chamber arises.

According to the present invention, as shown in FIGS. 23 and 24, by forming a plurality of partitioned fluid passages R having a small cross-sectional area in the hollow cylindrical energy exchange chambers 20 formed in the rotor 31, the seawater can be pressurized and discharged by the concentrated seawater while suppressing mixing of the concentrated seawater and the seawater. Also, in the energy exchange chamber apparatus shown in FIGS. 23 and 24, by providing a flow regulator in the same manner as the example shown in FIGS. 6 and 7, mixing of the concentrated seawater and the seawater can be reduced.

As described above, even in a method for switching the fluid passages by the directional control valve or the valve or a method in which the chambers are formed in the rotating rotor and are rotated, by forming a plurality of partitioned fluid passages fixed in the chamber between the concentrated seawater port and the seawater port, mixing of the concentrated seawater and the seawater can be suppressed and the seawater can be pressurized and discharged by the concentrated seawater.

Although certain preferred embodiments of the present invention have been described in detail, it should be understood that various changes and modifications may be made therein without being limited to the above embodiments and within the scope of technical idea of the present invention. For example, a configuration of the energy exchange chamber or the like is not limited to the above illustrated examples, and various changes and modifications may be made therein without departing from the scope of the present invention.

INDUSTRIAL APPLICABILITY

The present invention is applicable to a seawater desalination system for desalinating seawater by removing salinity from the seawater and an energy exchange chamber which is preferably used in the seawater desalination system.

The invention claimed is:

1. A seawater desalination system for producing fresh water from seawater by passing the seawater pressurized by a pump through a reverse-osmosis membrane-separation apparatus to separate the seawater into fresh water and concentrated seawater, said seawater desalination system comprising:
   an energy exchange chamber configured to utilize pressure energy of the concentrated seawater discharged from said reverse-osmosis membrane-separation apparatus as energy for pressurizing part of the seawater;
   said energy exchange chamber comprising:
      a concentrated seawater port for introducing and discharging the concentrated seawater;
      a seawater port for introducing and discharging the seawater; and
      a plurality of partitioned fluid passages provided in the chamber to allow said concentrated seawater port and said seawater port to communicate with each other.

2. The seawater desalination system according to claim 1, wherein said plurality of partitioned fluid passages comprise a plurality of tubes.

3. The seawater desalination system according to claim 1, wherein said plurality of partitioned fluid passages are formed by a plurality of partitions.

4. The seawater desalination system according to claim 1, wherein said plurality of partitioned fluid passages are formed by honeycomb.

5. The seawater desalination system according to claim 1, further comprising a pipe for supporting said plurality of partitioned fluid passages;
   wherein said pipe is fitted in said energy exchange chamber.

6. The seawater desalination system according to claim 5, wherein said pipe is divided into plural pieces in a longitudinal direction of said pipe.

7. The seawater desalination system according to claim 5, wherein said pipe is extended to a space in said energy exchange chamber in which said plurality of partitioned fluid passages are not provided.

8. The seawater desalination system according to claim 5, wherein said pipe has a hole for allowing an inner diameter side and an outer diameter side of said pipe to communicate with each other.

9. The seawater desalination system according to claim 1, wherein a plurality of said energy exchange chambers are provided; and there is provided at least one switching valve for switching supply of the concentrated seawater to said concentrated seawater port and discharge of the concentrated seawater from said concentrated seawater port in said plurality of energy exchange chambers.

10. The seawater desalination system according to claim 1, further comprising another energy exchange chamber comprising a concentrated seawater port for introducing and discharging the concentrated seawater, a seawater port for introducing and discharging the seawater, and a piston capable of reciprocating in the chamber.

11. The seawater desalination system according to claim 10, wherein said another energy exchange chamber has a sensor for detecting a position of said piston.

12. An energy exchange chamber for utilizing pressure energy of concentrated seawater discharged from a reverse-osmosis membrane-separation apparatus as energy for pressurizing seawater in a seawater desalination system for producing fresh water from the seawater by passing the seawater pressurized by a pump through said reverse-osmosis membrane-separation apparatus to separate the seawater into fresh water and concentrated seawater, said energy exchange chamber comprising:

a concentrated seawater port for introducing and discharging the concentrated seawater;

a seawater port for introducing and discharging the seawater; and a plurality of partitioned fluid passages provided in the chamber to allow said concentrated seawater port and said seawater port to communicate with each other.

13. The energy exchange chamber according to claim 12, wherein said plurality of partitioned fluid passages comprise a plurality of tubes.

14. The energy exchange chamber according to claim 12, wherein said plurality of partitioned fluid passages are formed by a plurality of partitions.

15. The energy exchange chamber according to claim 12, wherein said plurality of partitioned fluid passages are formed by honeycomb.

16. The energy exchange chamber according to claim 12, further comprising a pipe for supporting said plurality of partitioned fluid passages;

wherein said pipe is fitted in said energy exchange chamber.

17. The energy exchange chamber according to claim 16, wherein said pipe is divided into plural pieces in a longitudinal direction of said pipe.

18. The energy exchange chamber according to claim 16, wherein said pipe is extended to a space in said energy exchange chamber in which said plurality of partitioned fluid passages are not provided.

19. The energy exchange chamber according to claim 16, wherein said pipe has a hole for allowing an inner diameter side and an outer diameter side of said pipe to communicate with each other.

20. The energy exchange chamber according to claim 12, wherein a flow regulator is provided between said concentrated seawater port and said plurality of partitioned fluid passages.

21. The energy exchange chamber according to claim 12, wherein a flow regulator is provided between said seawater port and said plurality of partitioned fluid passages.

* * * * *